(12) United States Patent
Jones et al.

(10) Patent No.: US 10,258,051 B2
(45) Date of Patent: Apr. 16, 2019

(54) LIGHTWEIGHT STUNNING ROD

(71) Applicant: Jarvis Products Corporation, Middletown, CT (US)

(72) Inventors: Arthur Jones, Tabor, IA (US); Trent Jones, Tabor, IA (US)

(73) Assignee: JARVIS PRODUCTS CORPORATION, Middleton, CT (US)

( * ) Notice: Subject to any disclaimer, the term of this patent is extended or adjusted under 35 U.S.C. 154(b) by 0 days.

(21) Appl. No.: 16/051,822

(22) Filed: Aug. 1, 2018

(65) Prior Publication Data

US 2019/0053504 A1 Feb. 21, 2019

Related U.S. Application Data

(60) Provisional application No. 62/545,718, filed on Aug. 15, 2017.

(51) Int. Cl.
*A22B 3/00* (2006.01)
*A22B 3/02* (2006.01)

(52) U.S. Cl.
CPC ..................... *A22B 3/02* (2013.01)

(58) Field of Classification Search
CPC .............. A22B 3/02; A22B 3/00; A22B 3/005
USPC ........... 452/57, 62; 42/1.14, 1.12, 52, 44, 64
See application file for complete search history.

(56) References Cited

U.S. PATENT DOCUMENTS

| | | | | |
|---|---|---|---|---|
| 4,219,905 | A * | 9/1980 | Thacker | A22B 3/02 452/62 |
| 4,446,597 | A * | 5/1984 | Dantzer-Sorensen | E05D 3/16 16/347 |
| 4,503,585 | A * | 3/1985 | Hamel | A22B 3/02 227/130 |
| 4,575,900 | A * | 3/1986 | Hamel | A22B 3/02 227/130 |
| 4,625,442 | A * | 12/1986 | Hill | A22B 3/02 227/10 |
| 5,375,331 | A | 12/1994 | Meixner | |
| 5,692,951 | A * | 12/1997 | Huff | A22B 3/02 452/57 |
| 6,027,403 | A | 2/2000 | Hazenbroek et al. | |
| 6,135,871 | A | 10/2000 | Jones | |
| 6,170,477 | B1 * | 1/2001 | Horlock | F41B 11/83 124/61 |
| 2004/0209562 | A1 * | 10/2004 | Jones | A22B 3/02 452/62 |
| 2013/0023190 | A1 * | 1/2013 | Evans | A22B 3/02 452/62 |

* cited by examiner

*Primary Examiner* — Richard T Price, Jr.
(74) *Attorney, Agent, or Firm* — DeLio, Peterson & Curcio, LLC; Peter W. Peterson

(57) ABSTRACT

A pneumatic stunner for stunning an animal has a piston slideable within an inner chamber, and a stunning rod driven by the piston forward and rearward towards and away from the front end of the housing. The stunning rod has an elongated body having a longitudinal axis and a detachable hardened tip. The density of the material comprising the elongated body is less than the density of the material comprising the detachable hardened tip.

29 Claims, 25 Drawing Sheets

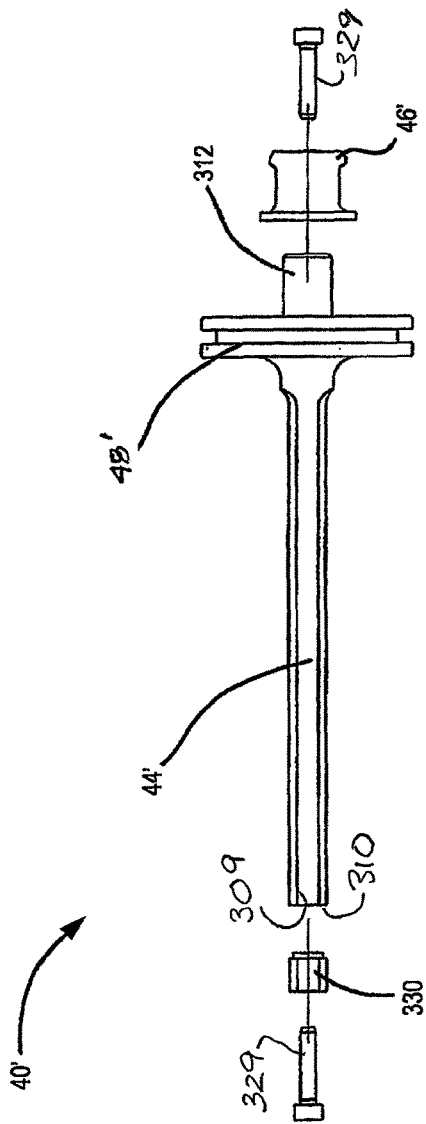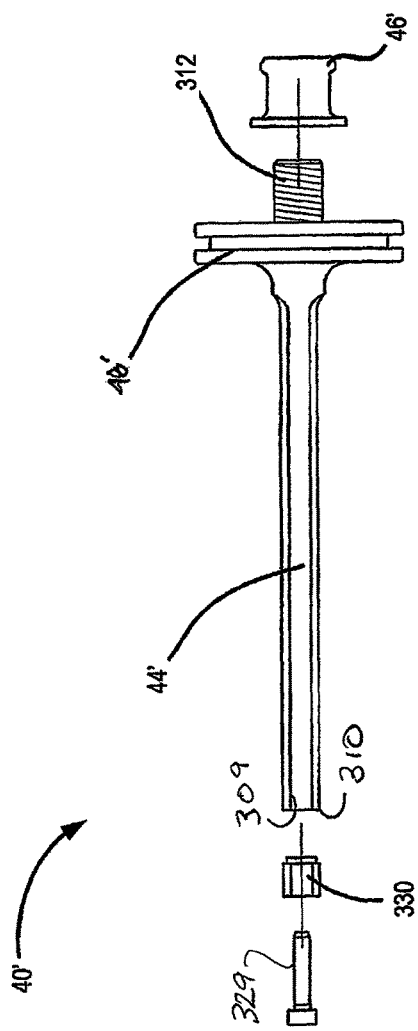

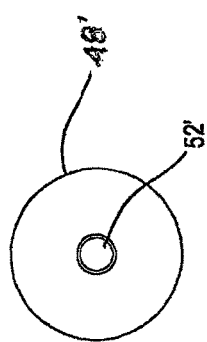
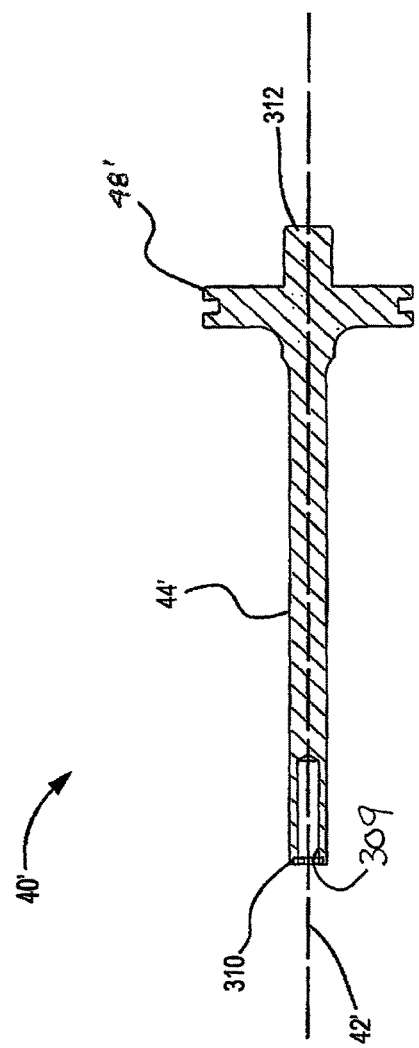
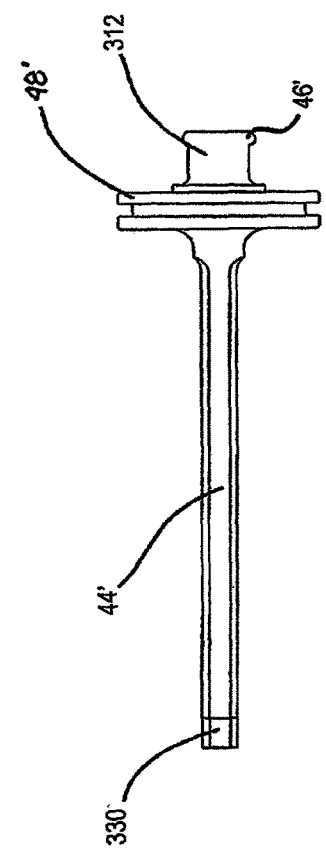
FIG. 39
FIG. 40
FIG. 41

Section 43-43

Section 55-55

LIGHTWEIGHT STUNNING ROD

BACKGROUND OF THE INVENTION

1. Field of the Invention

This invention relates in general to a pneumatic animal stunner for use in livestock/slaughterhouse operations and more specifically to the animal stunner rod, the catch system for holding and releasing the stunning rod, the compressed air supply used to retract the stunning rod between operation cycles, and the handles used by the operator to hold the stunner.

2. Description of Related Art

In livestock production plants, it is important to stun and disable an animal for processing. Although numerous methods have been used to stun livestock, captive bolt mechanisms have proven to be the most efficient, inexpensive, and humane way to disable the animal. Particularly, pneumatic captive bolt devices have been used in this capacity.

U.S. Pat. No. 6,135,871 and U.S. Patent Publication No. 2004/0209562, the disclosures of which are hereby incorporated by reference, disclose pneumatic animal stunners that, among other things, include a physical catch for the piston that drives the stunning rod.

FIGS. 1 and 2 show a prior art catch arrangement for a stunner in which stunning rod 1 extending rightward (forward) from a piston 2 has a leftward (rearward) end with outwardly extending lips 3 that may be alternately held and released by inward extending lips at the end portion 4a of a catch 4. At a central portion of the body of catch 4 is an inwardly extending flange 4b which is pivotable about an outwardly extending flange 6a of catch pivot post 6. A catch piston 5 includes an inner bore 5a at a forward end, an inner bore 5c at a rearward end, and a relief portion 5b between the two. In the hold position of FIG. 1, the catch piston 5 is slid longitudinally rearward so that forward inner bore 5a contacts and moves catch forward end 4a toward and into engagement with stunning rod lips 3, at the same time that rearward inner bore 5c contacts the outer surface of catch rearward end 4c. In the release position of FIG. 2, the catch piston 5 is slid longitudinally forward so that forward inner bore 5a moves forward of catch forward end 4a, and the relief portion 5b permits catch forward end 4a to move outward and out of engagement with stunning rod lips 3 as the flange 4b of catch 4 pivots about catch post pivot flange 6a. At the same time, catch piston rearward inner bore 5c slides forward and then moves out of contact with the outer surface of catch rearward end 4c. Upon release of the stunning rod lips, compressed air behind piston 2 moves stunning rod 1 forward to stun the animal.

The catch and other components of such prior designs function well, but in operation some of its components are subject to sliding engagement with other components, and therefore interference and/or wear, which causes drag and/or requires periodic replacement of such components. This gradual wear of such components is compounded by the overall weight and density of the stunning rod used with the stunner, which is typically composed of steel in the prior art. The stunning rod is also subject to rotation during usage.

Compressed air usage by prior art stunners is also an issue, since excess air volume needed for each stunner cycle increases costs of operation. Additionally, the operator is subject to fatigue when using the stunner repeatedly, due to the shock of the stunning rod projection and retraction in each operation cycle combined with the heavy weight/high density of the steel stunning rod.

SUMMARY OF THE INVENTION

Bearing in mind the problems and deficiencies of the prior art, it is therefore an object of the present invention to provide an animal stunner having a release system which reduces wear of the moving parts controlling the operation of the animal stunner.

It is another object of the present invention to provide an animal stunner having reduced drag on movement between the catch and catch piston during operation.

A further object of the invention is to provide an animal stunner having reduced wear on the catch and catch piston as a result of repeated operation and reduced premature failure.

It is yet another object of the present invention to provide an animal stunner having more reliable stunning due to a stronger and improved catch system.

Yet a further object of the present invention is to provide an animal stunner having improved operator safety as a result of a stronger catch system.

Another object of the present invention is to provide an animal stunner having lower compressed air usage between each stunner cycle.

A further object of the invention is to provide an animal stunner having improved operator comfort and reduction of possible injury.

Yet another object of the present invention is to provide an animal stunner in which the stunning rod slides easily and reliably without rotation.

Still another object of the present invention is to provide an animal stunner in which the stunning rod slides in a faster and more accurate manner while simultaneously reducing the overall wear of the inner components of the stunner and fatigue experienced by the operator over multiple, continuous cycles of use.

Still other objects and advantages of the invention will in part be obvious and will in part be apparent from the specification.

The above and other objects, which will be apparent to those skilled in the art, are achieved in the present invention which is directed in one aspect to a stunning rod adapted for use in a pneumatic animal stunner for stunning an animal, wherein the rod is mountable with a piston and movable within an inner chamber in the stunner, and the inner chamber has a catch for alternately holding and releasing the stunning rod. The rod comprises an elongated body having a density, a forward end sized to receive a detachable tip, an opposite rearward end adapted to receive an outwardly extending lip for engagement with the catch. The rod stunning further comprises a detachable tip for striking an animal's head, the detachable tip being received in and secured to the forward of the end of the elongated body, the detachable tip having a density greater than the density of the elongated body. The stunning rod is capable of being driven forward along a longitudinal axis within the stunner inner chamber to stun an animal, and rearward along the longitudinal axis to retract and hold the stunning rod by the catch.

In a related aspect the present invention is directed to a method of making a stunning rod adapted for use in a pneumatic animal stunner for stunning an animal, wherein the rod is mountable with a piston and movable within an inner chamber in the stunner, and the inner chamber has a catch for alternately holding and releasing the stunning rod.

The method comprises providing an elongated body having a density, a forward end sized to receive a detachable tip, an opposite rearward end adapted to receive an outwardly extending lip for engagement with the catch. The method also comprises providing a detachable tip for striking an animal's head, the detachable tip having a density greater than the density of the elongated body. The method further comprises attaching the detachable hardened tip to the elongated body forward end to create a stunning rod. The stunning rod is capable of being driven forward along a longitudinal axis within the stunner inner chamber to stun an animal, and rearward along the longitudinal axis to retract and hold the stunning rod by the catch.

The stunning rod elongated body between the rearward end and forward end may have a density less than that of steel, and less than the density of the detachable tip. The stunning rod elongated body density may be less than 7.5 g/cm$^3$ and the detachable tip density may be greater than 7.5 g/cm$^3$. The stunning rod elongated body may be made of aluminum, and the detachable tip may be made of hardened steel.

The stunning rod forward end of the elongated body may have a beveled opening and the detachable tip may have a beveled lower end received in the forward end, the forward end beveled opening and the tip lower end being beveled at supplementary angles.

The stunning rod elongated body may include a piston movable within an inner chamber in the stunner, wherein the piston is adjacent the elongated body rearward end and integral and of one piece with the body. The elongated body rearward end may be threaded to receive a complementarily threaded outwardly extending lip for engagement with the catch. The stunning rod elongated body and detachable tip may have circular or non-circular cross sections.

In yet another aspect the present invention is directed to a pneumatic animal stunner, wherein the stunner has an inner chamber, and including a stunning rod as described above mountable with a piston and movable within the inner chamber, and wherein the inner chamber has a catch for alternately holding and releasing the stunning rod for stunning an animal.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 37 is an exploded side view of the stunning rod of FIG. 35 with a hardened tip and rearward end catch lip both attached to the rod by a screw.

FIG. 38 is an exploded side view of an alternate embodiment of the stunning rod of FIG. 37 with the rearward end catch lip attached via a threaded end post.

FIG. 39 is a longitudinal cross-sectional view of the stunning rod and piston of FIG. 35.

FIG. 40 is a side view of the assembled stunning rod of FIG. 37.

FIG. 41 is a rear view of the stunning rod and piston of FIG. 35.

DESCRIPTION OF EMBODIMENT(S)

Figure 1:
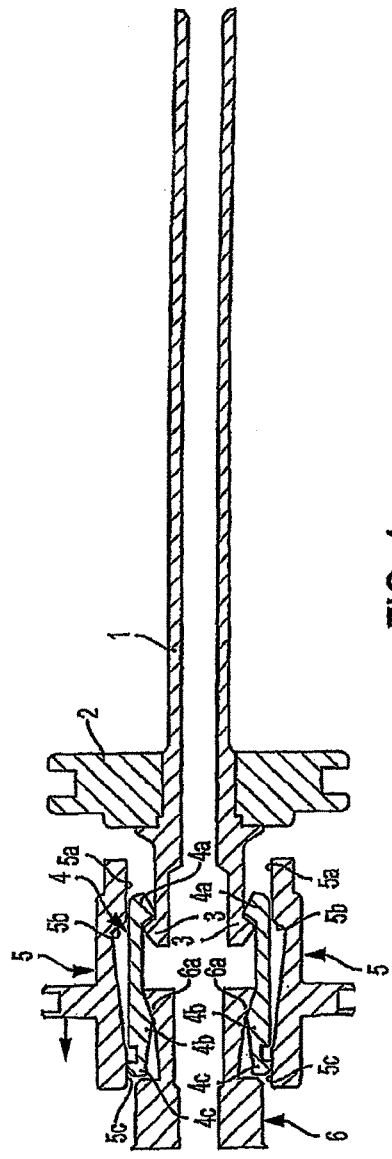
FIGS. 1 and 2 are cross sectional views of a prior art stunner catch system in hold and release positions, respectively.
Figure 2:
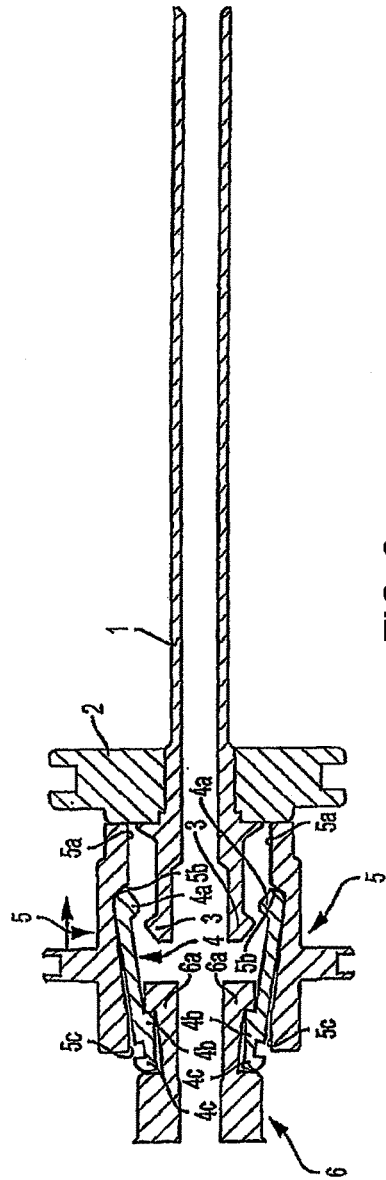

In describing the embodiment(s) of the present invention, reference will be made herein to FIGS. 1-57 of the drawings in which like numerals refer to like features of the invention.

Structure and operation of the exemplary animal stunner 10 is shown in general in FIGS. 3-8. The stunner 10 includes an outer elongated hollow housing 12, an outer housing nose or front end 14, a tail end 16, a stunning rod 40 and a catch 20 for holding and releasing the stunning rod 40. The portion of the animal stunner 10 having a catch is shown in detail in FIGS. 7 and 8. The forward and rearward directions described herein are with respect to the stunner front end 14, and inward and outward directions described herein are with respect to the longitudinal axis 42. A piston 48 surrounded by an O-ring seal 66 slides within an inner cylindrical chamber 180 forward and rearward along axis 42, and carries stunning rod 40. The rearward end of stunning rod 40 ends in an outward extending lip 46 that is alternately held and released by catch 20, and the forward end of the stunning rod extends through head contact 18 to be driven toward the animal's head when the catch releases the stunning rod lip 46.

Figure 25:
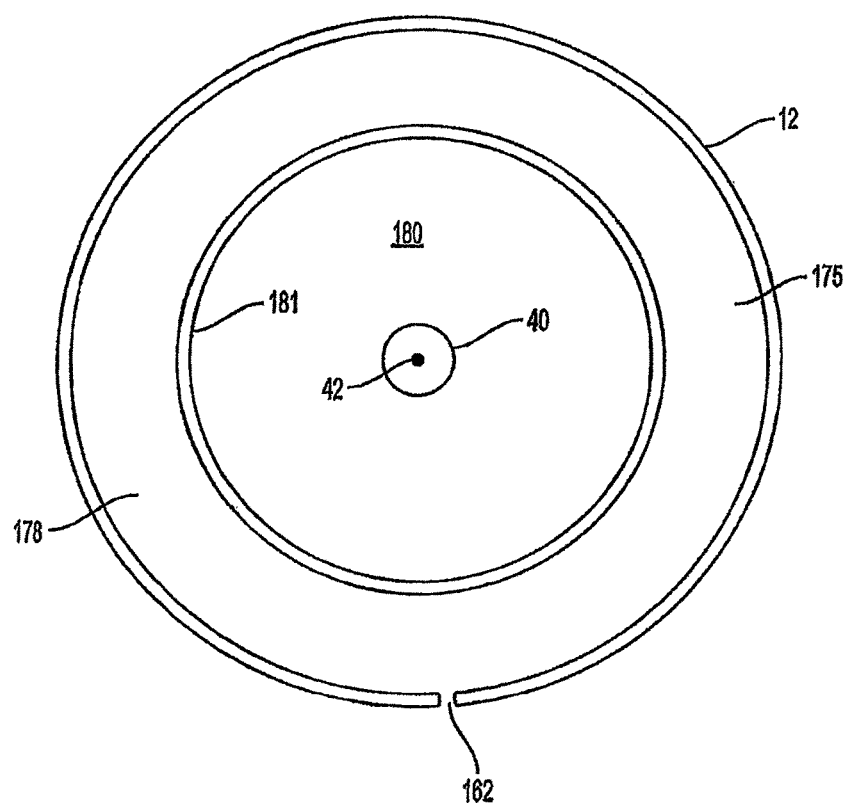
FIG. 25 is a partial cross sectional view of the housing of the stunner of FIGS. 3-6 normal to its longitudinal axis, showing the inner and return air chambers along lines 25-25 of FIGS. 3-6.

Stunner 10 may be operated by pressurized fluid, such as (but not limited to) compressed air for the example shown. Outward of and shown as surrounding inner chamber 180 adjacent its central portion and rearward end is annular cylindrical first pressure or fire chamber 170. Compressed air can move freely and quickly between fire chamber 170 to the region of inner chamber 180 behind piston 48 upon operation of main valve 165. As shown in FIG. 25, annular cylindrical second pressure or return chamber 175 is also adjacent to, and shown as surrounding inner chamber 180 adjacent its central portion and forward end in the example of FIGS. 3-6. A catch piston chamber 188 is located adjacent and around catch piston 50, which itself holds and releases catch 20. Chambers 170, 175, 180 and 188 may be pressurized to operate the stunner shown, as will be described in more detail below.

A first or main trigger 146 in main handle 136 is used to control a main handle valve 142 to the pressurized fluid, compressed air as used herein, to initiate the sequence that fires the stunning rod. For purposes of safety, to operate the exemplary stunner shown there are two additional conditions that must be met before the catch mechanism for the stunning rod is released. The head contact activator 18 located at the front of the tool must be in contact with the animal to receive the stroke and a second or auxiliary trigger 114 in auxiliary handle 110 must be manually operated. Although it is possible to construct and operate the stunner with only one of these three, at least two, and preferably all three, should be employed for safety.

Figure 26:
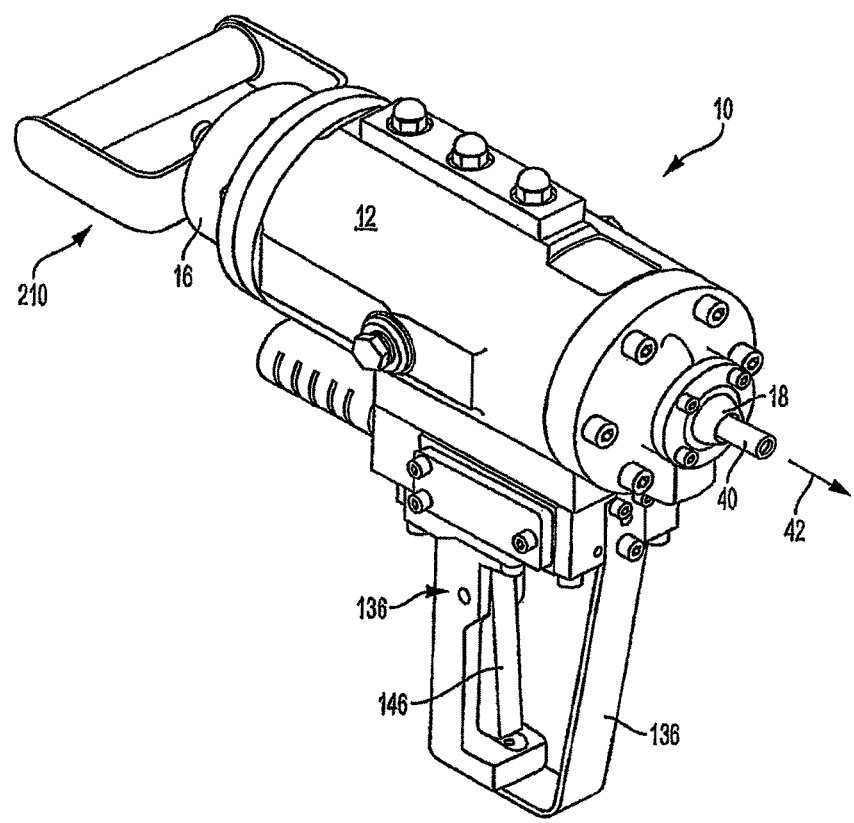
FIG. 26 is a perspective view of another embodiment of the stunner of the present invention, without the auxiliary trigger in the rear handle.
Figure 27:
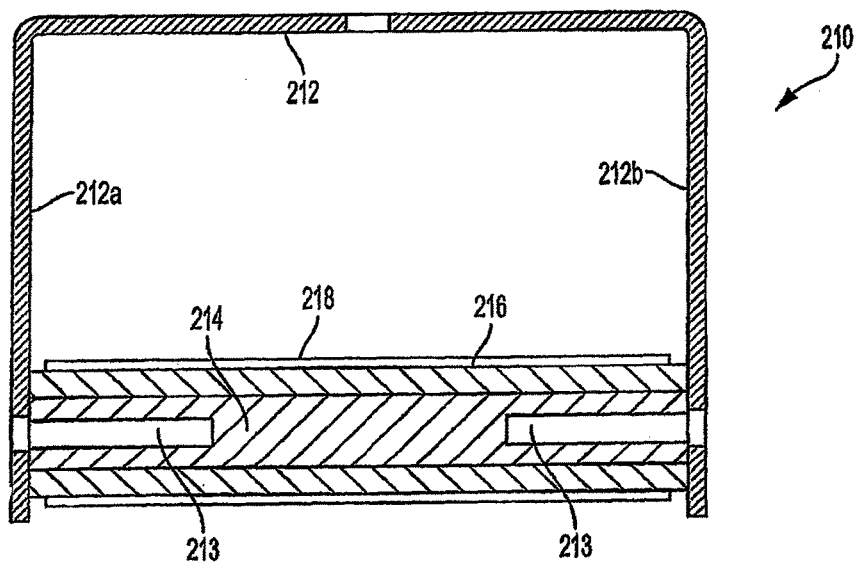
FIG. 27 is a cross sectional view of the handle grip of the stunner of FIG. 26.

An embodiment of the present invention employing main trigger 146, controlling main handle valve 142, and head contact activator 18 is shown in FIG. 26. In this embodiment, a second or auxiliary trigger is not provided, and instead a grip handle 210 is positioned at the tail end 16 of housing 12. Grip handle 210 as shown in FIG. 27 comprises a mounting bracket 212 and an inner handle bar 214 secured by a pair of connecting rods 213 extending inwardly from a pair of mounting bracket arms 212a, 212b. A flexible mount 216 of rubber or other polymer surrounds inner bar 214 to provide cushioning to outer handle tube 218 disposed thereover. In this embodiment the operator may hold grip handle 210 in one hand while holding main handle 136 in the other. While depressing and holding trigger 146 in main handle 136, the operator may then displace head contact activator 18 against the head of the animal to fire the stunning rod.

Figure 3:
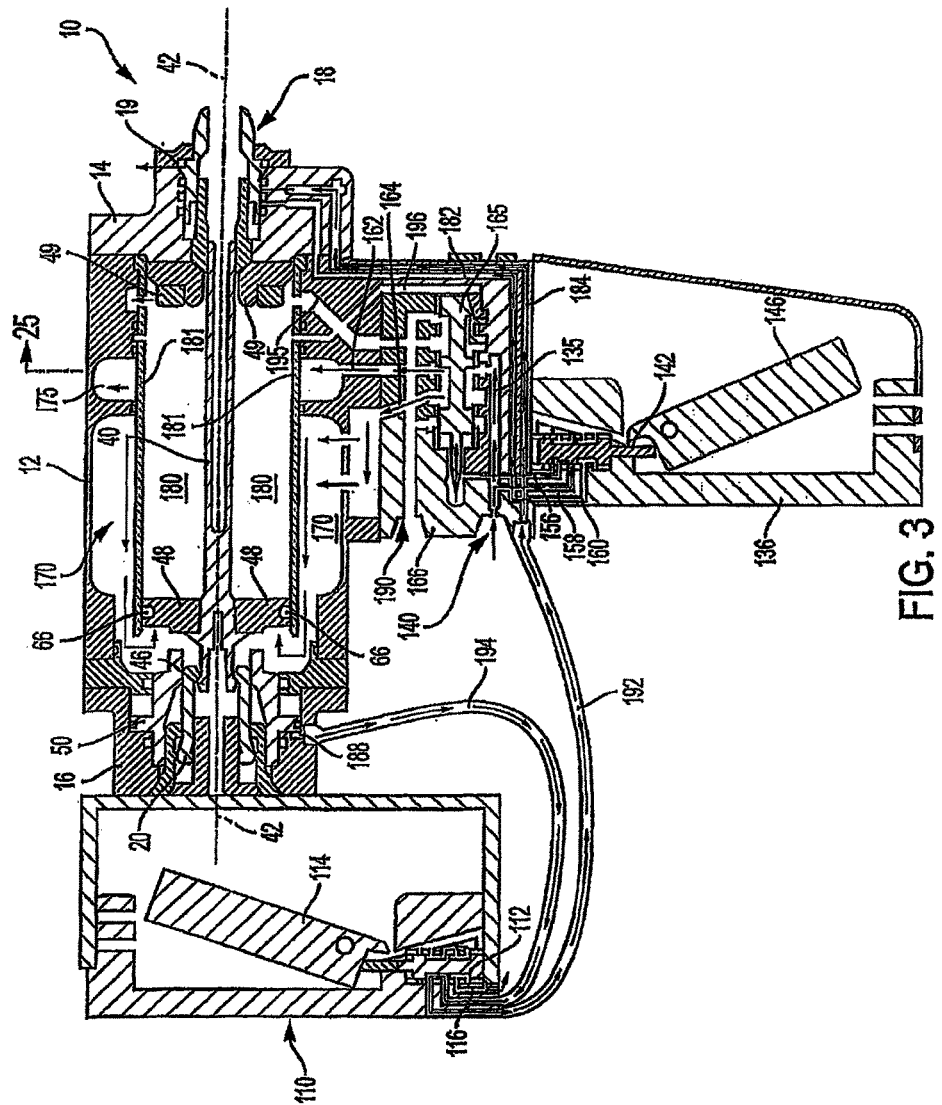
FIG. 3 is a side cross-sectional view of an animal stunner with the catch hold position, with valves in neutral position, with the air supply pressurized and prior to firing, according to the present invention.

FIG. 3 shows the animal stunner 10 with the catch 20 hold position, with valves in the neutral position, and with the air supply pressurized and prior to firing. An air hose (not shown) is attached to the supply port 140 on the main chamber valve body 166, and main valve body 166 is pressurized by the compressed air. Main valve 165 within valve body 166 is positioned to the right by spring (not shown) pressure and pressure force conveyed from air passages 158 (connected to supply port 140) through the main handle valve 142 and then through passageway 156. The main valve spool 165 in this position will simultaneously pressurize, via passageways 135, 162 and 164, the fire chamber 170 and also the smaller return chamber 175, both at a slower fill rate. The stunning rod piston 48 is fully pressurized by air flow from fire chamber 170 behind the piston, and retained from movement by the closed catch 20 assembly holding stunning rod lip 46, as will be explained further below. The main handle valve 142 is in the neutral position and not yet activated by main trigger 146, and valve 142 is extended by spring (not shown) pressure downward, so that the air passage via passageway 184 to the head contact 18 is vented through the main handle valve 142. The head contact 18 is extended by spring (not shown) pressure forward (rightward). Any air pressure on the extend side of the catch piston 50 in chamber 188 is vented via passageways 194 through the auxiliary handle vent 116, and any air pressure in passageway 192 is vented via passageway 184 through the head contact vent 19. The area under and behind the stunning rod piston 48 is vented through the main valve body 166 into the exhaust port 190. The stunner will not fire in this position, wherein main trigger 146, auxiliary trigger 114 and head contact 18 are not depressed.

Figure 4:
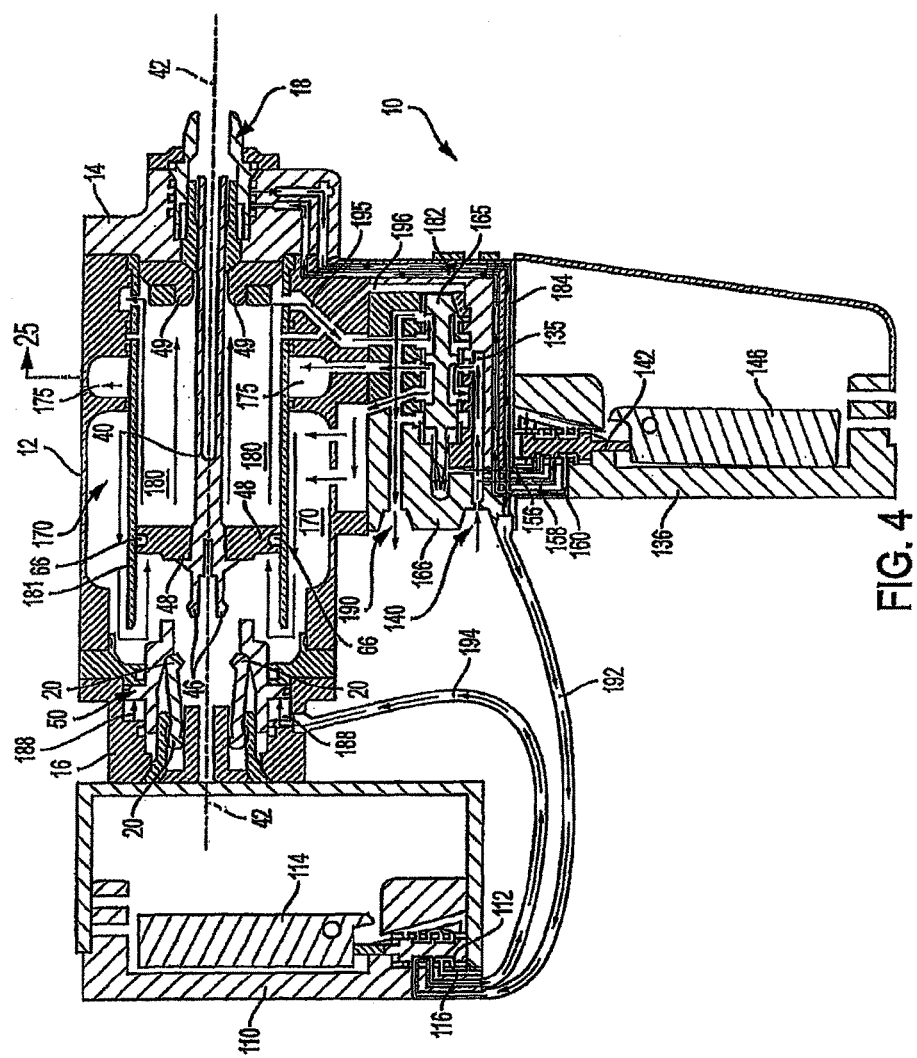
FIG. 4 is a side cross-sectional view of the animal stunner of FIG. 3 with the catch release position and with valves in the firing position, according to the present invention.

FIG. 4 shows the animal stunner with the catch 20 release position, with valves 142, 165, 112 and 18 in the firing position. To commence the firing sequence, the main handle valve 142 is activated by the operator depressing main trigger 146 with one hand, head contact 18 is activated by the operator pressing against the animal's head to move the contact rearward (leftward), and auxiliary handle valve 112 is activated by the operator depressing auxiliary trigger 114 with the other hand. As the main handle valve moves into the upward position, air passage from the main handle valve 142 to main valve spool (spring end) is exhausted via passageway and air passage from the main handle valve 142 to head contact 18 is pressurized via passageway 182. Compressed air also flows via air passage 194 to the catch piston cylinder chamber 188 after flow through the head contact valve 18, passageway 184 and passageway 192 through the auxiliary handle valve 112. As a result of head contact 18 being depressed and auxiliary handle valve 112 being pressurized, catch piston 50 is moved by the compressed air in chamber 188 and extends forward (rightward) to its limit and opens the catches 20. As a result, stunning rod 40 is released and moves forward (rightward) at a high rate of speed, while the air in chamber 180 under and forward of the stunning rod piston 48 is exhausted through passageway 195 and the main valve body 166 exhaust port 190.

Figure 5:
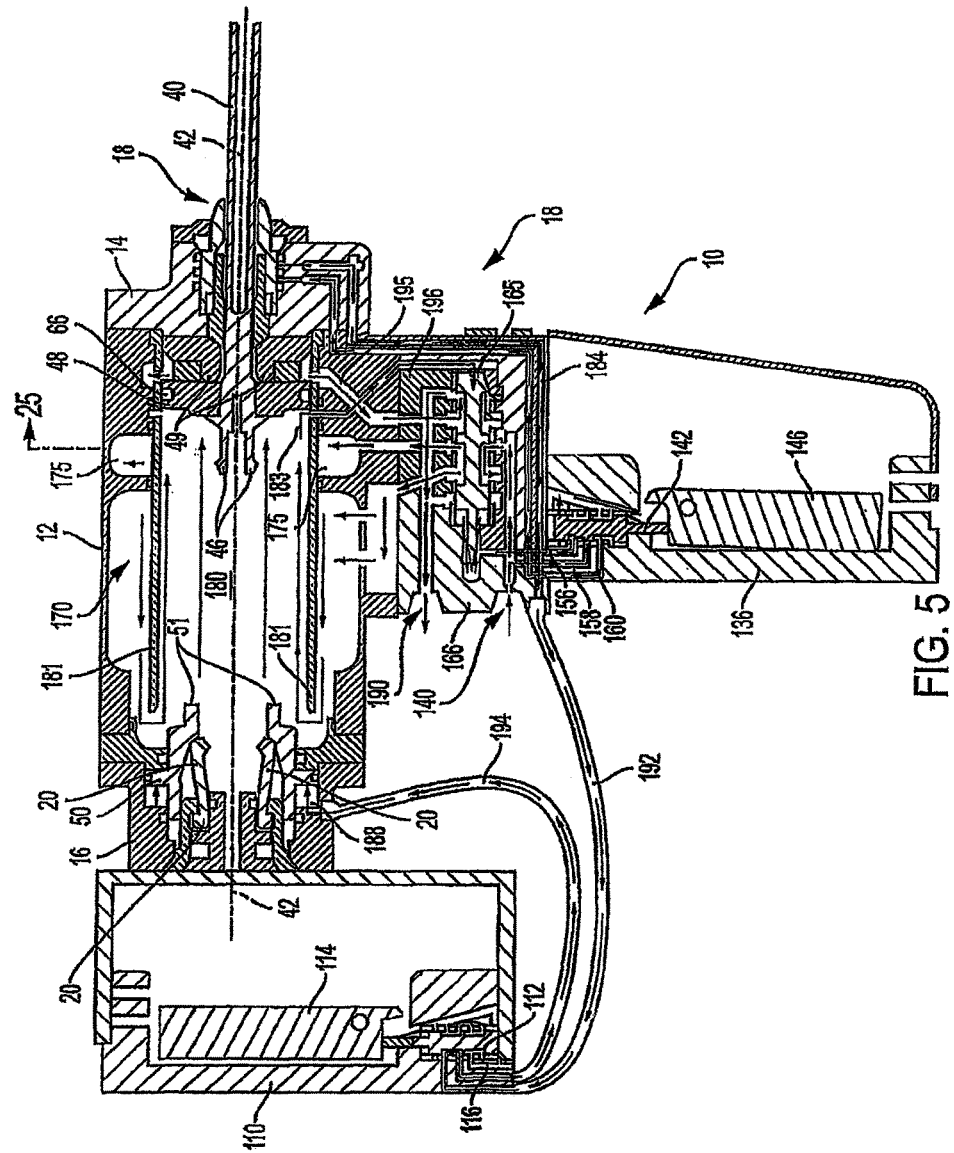
FIG. 5 is a side cross-sectional view of the animal stunner of FIG. 3 with the stunning rod in the end-of-stroke position, according to the present invention.

FIG. 5 shows the animal stunner 10 with the stunning rod 40 in the full forward, end-of-stroke position. The stunning rod stroke is stopped by the annular cushions 49 next to and inside of the nose housing 14. In this position the stunning rod piston seal 66 extends forward and beyond the small holes 183 in the liner 181 of chamber 180 allowing air flow into the main valve reverse passage 196 to the bottom (rightward) end of the main valve spool 165. As main valve 165 is pressurized, the spool commences moving upward (leftward) against the pressure of the spring to reverse the flow of air to the stunning rod piston 48.

Figure 6:
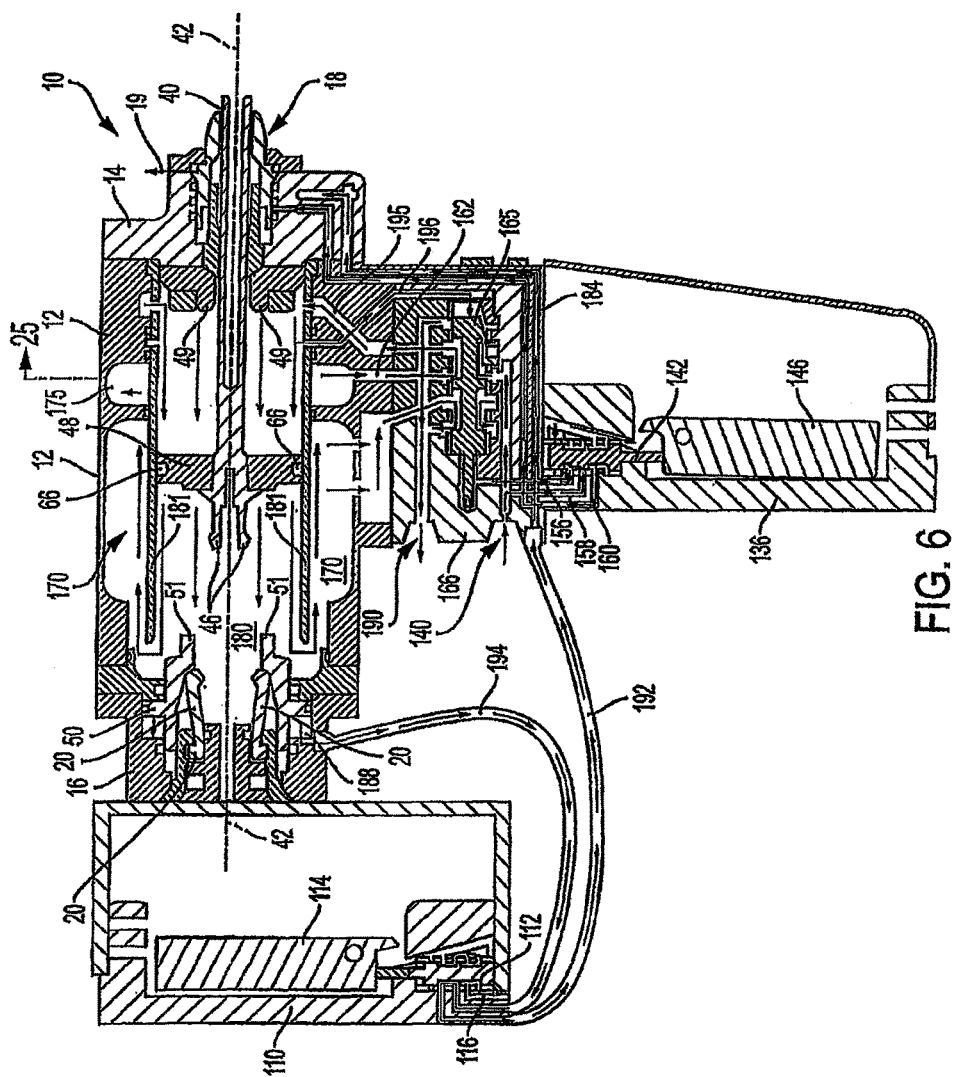
FIG. 6 is a side cross-sectional view of the animal stunner of FIG. 3 with the air in main valve in the reverse position to retract the stunning rod, according to the present invention.

FIG. 6 shows the animal stunner near the end of the firing sequence with the air in main valve 165 moved into the reverse position to retract the stunning rod, as a result of compressed air flow from reverse passage 196 (FIG. 5). Both main handle valve 142 and auxiliary handle valve 112 are still depressed and activated, but head contact 18 is released from the animal's head so that contact valve 18 returns to the forward (rightward) position. Main valve 165 reverse passage 196 is pressurized forcing the main valve spool to move upward (leftward) against the pressure of the spring, so that the main valve body air flow is reversed. As this occurs, fire air chamber 170 is exhausted through the main valve body 166 into the exhaust port 190, and air flow is reversed via passage 194 from the catch piston 50 chamber 188 through open auxiliary handle valve 112, passageways 192 and 184 and out through the head contact 18 vents 19 when the head contact 18 is released. The compressed air pressure immediately available from the return chamber 175 causes pressurized air to move freely and quickly to flow via passageways 162 (FIGS. 6 and 25), main valve 165 and passageway 195 into the forward (rightward) end of chamber 180 (FIG. 6). Although return chamber 175 is volumetrically smaller and contains less pressurized fluid than fire chamber 170, it is sized to provide sufficient air to drive piston 48 and stunning rod 40 rearward. This use of compressed air from adjacent return chamber 175 reduces the volume of air needed as compared to prior art methods where the air to return the piston is supplied via internal passageways from the supply port. Instead of relying on a short, higher pressure blast of compressed air through the supply port at the same time the piston return cycle is initiated, the present invention pre-supplies the compressed piston return air at the same time the fire chamber is pressurized, during the longer time available between operation cycles. This permits restriction orifices of desired sizes to be used at the supply port 140, thereby saving on total air volume usage by the stunner.

The pressurized air in chamber 180 forward end retracts the stunning rod 40 rearward (leftward) as shown in FIG. 6 until piston 48 contacts the forward end 51 of catch piston 50. As a result of the piston striking it, the catch piston 50 is retracted rearward (leftward) into the catch cylinder 188, which closes the catches 20 by forcing them inward to capture stunning rod lip 46, so that the stunning rod 40 is retained by the catches, as shown in FIG. 3.

When the main handle valve 142 is returned to neutral as a result of main trigger 146 being released and in the undepressed position (FIG. 3), air passage to main valve spool (spring end) is again pressurized, and shifts valve 165 to its original position. Both fire chamber 170 and return chamber 175 are again pressurized, air passage to the nose is exhausted via vent 19, auxiliary handle valve 112 is returned to neutral as a result of auxiliary trigger 114 being released, any pressure is vented through vent 116 of the auxiliary handle valve 112 so that air passage to the catch piston 50 is vented two ways for safety, and will not fire again until the firing sequence is again started. The order of firing sequence has no impact on the stunner performance, and both triggers 146, 114 and the head contact 18 must be activated in any order before firing will occur in this embodiment.

Figure 28:
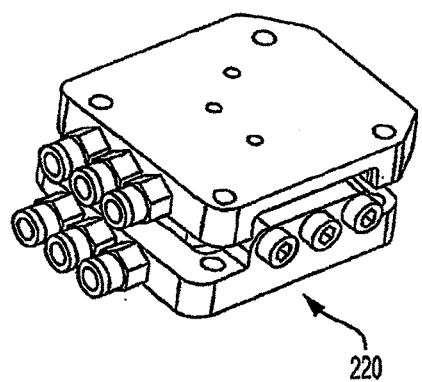
FIG. 28 is a perspective view of an embodiment of a mount employed between the main handle and main valve body of the stunner of the present invention.
Figure 29:
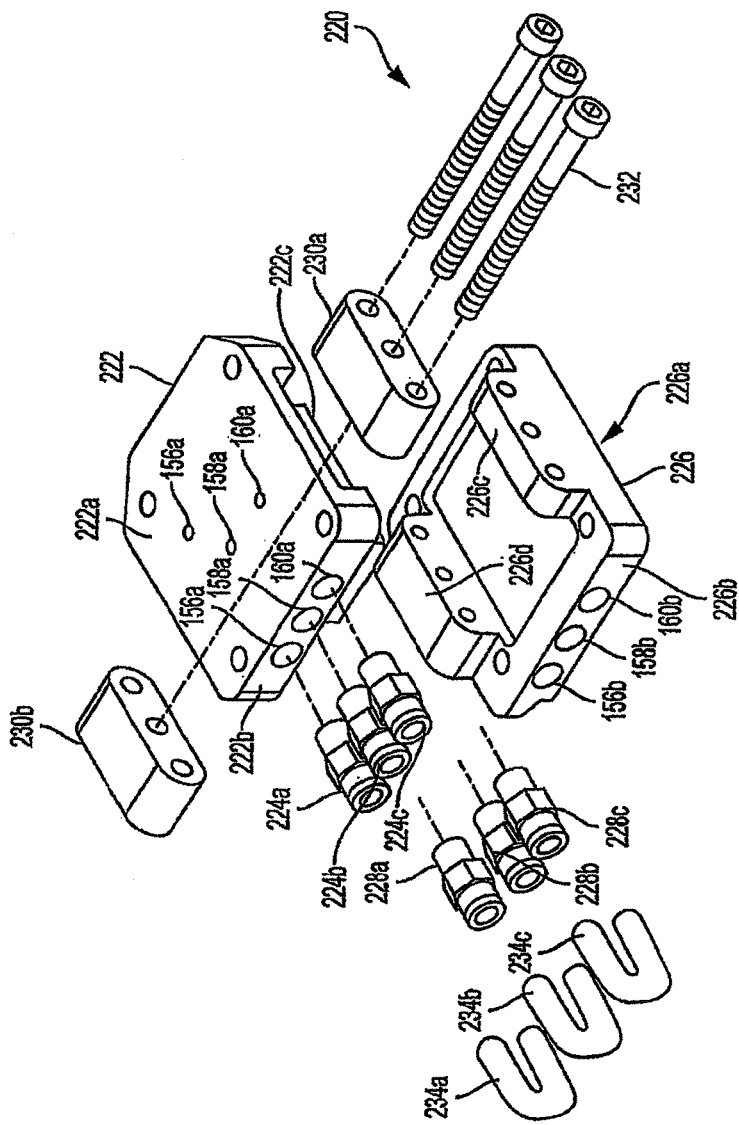
FIG. 29 is an exploded perspective view of the handle mount of FIG. 28.
Figure 30:
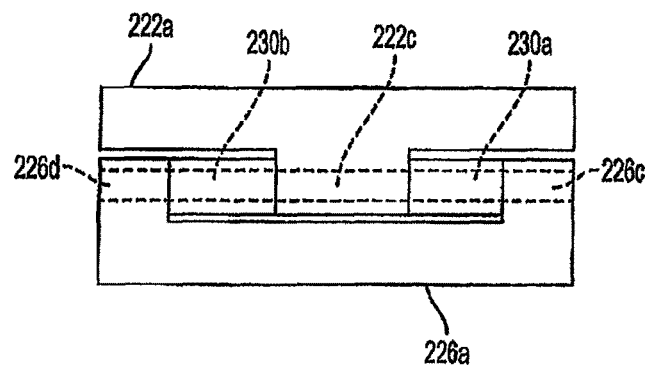
FIG. 30 is a cross sectional view of the mount of FIG. 28 showing the anti-shock members.

Main handle 136 is shown in FIGS. 3-6 as being secured directly to main valve body 166. To provide cushioning to mitigate any shock due to the firing of the stunning rod, and therefore reduce operator injury and increase operator comfort, there may be provided a cushion mount for main handle 136. Such a mount 220 is shown in FIGS. 28-30 for insertion between main handle 136 and main valve body 166. Cushion mount 220 includes a first or upper portion 222, which is connected or otherwise secured to the lower side of housing 12, and a second or lower portion 226, which is connected or otherwise secured to the upper end of main handle 136. Upper portion 222 includes passageways 156*a*, 158*a*, 160*a* which mate at upper surface 222*a* with passageways 156, 158, 160, respectively, (FIGS. 3-6) opening from the lower end of main valve body 166. Passageways 156*a*, 158*a*, 160*a* connect through upper portion 222 at side surface 222*b* with fittings 224*a*, 224*b*, 224*c*, respectively. In lower portion 226 passageways 156*b*, 158*b*, 160*b* mate at lower surface 226*a* with passageways 156, 158, 160, respectively, (FIGS. 3-6) opening from the upper end of main handle 136. Passageways 156*b*, 158*b*, 160*b* connect through lower portion 226 at side surface 226*b* with fittings 228*a*, 228*b*, 228*c*, respectively. Hoses or tubes 234*a*, 234*b*, 234*c* connect fittings 224*a*, 224*b*, 224*c* with fittings 228*a*, 228*b*, 228*c*, respectively.

Between mount upper portion 222 and a lower portion 226 there are provided a pair of anti-shock members 230*a*, 230*b*, which may be made of rubber cushions or other flexible polymer. Anti-shock members 230*a*, 230*b* may be in the configuration of elongated blocks (i.e., parallelepipeds) or other shapes disposed on either side between a central flange 222*c* extending downwardly from upper portion 222, and a pair of side flanges 226*c*, 226*d* extending upwardly from lower portion 226. One or more fasteners 232, here shown as three bolts, may extend in the same direction as or normal to longitudinal axis 42 into and through corresponding aligned openings in side flange 226*c*, anti-shock member 230*a*, central flange 222*c*, anti-shock member 230*b* and side flange 226*d*. The major surfaces of members 230*a*, 230*b* and axes of the fasteners 232 are contained in planes parallel to the longitudinal axis 42 of the housing 12. Except for the fasteners, anti-shock members 230*a*, 230*b* completely isolate mount upper portion 222 from mount lower portion 226, and absorb vibration and shock transmitted from the body of stunner 10 to main handle 136.

Figure 31:
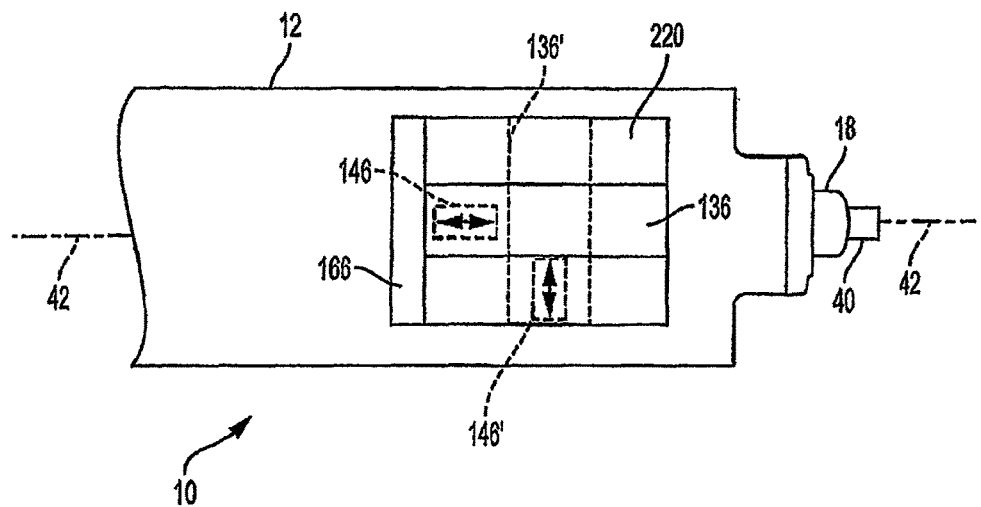
FIG. 31 is a bottom view of an embodiment of the main handle and mount of the stunner of the present invention, showing different fixed orientations of the main handle and trigger.
Figure 34:
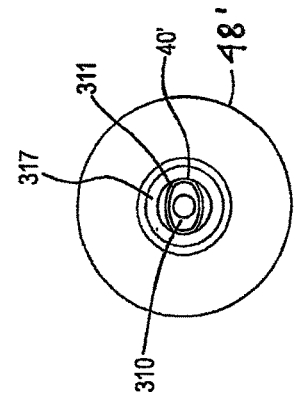
FIG. 34 is a frontal view of the stunning rod of FIG. 32 with a piston, according to an alternate embodiment of the present invention.

With or without the anti-shock members, mount 220 may be provided in different patterns of passageways 156*a*, 158*a*, 160*a* and/or passageways 156*b*, 158*b*, 160*b*, to connect to the main handle 136 and/or main valve body 166 at different orientations than the conventional one shown in the drawings, where the trigger 146 movement is aligned with the longitudinal axis 42 of the stunner housing 12. As shown in FIG. 31, this would permit handle 136 and trigger 146 movement to be mounted to main valve body 166 or housing 12 in a different fixed position and aligned to an orientation other than that of stunner longitudinal axis 42, for example, with handle 136' and trigger 146' movement in a direction 90° to axis 42. The different main handle orientations may accommodate different layouts in the plant operations or operator comfort, for example, due to pneumatic activation instead of mechanical activation of the valve with the trigger.

An alternate embodiment of a stunning rod useful in the stunner of the present invention is shown in FIGS. 32-48. This alternate embodiment of stunning rod 40' depicted herein may be used in place of stunning rod 40 described previously, and comparable portions of the rod are numbered similarly, but with a prime (') mark.

Figure 44:
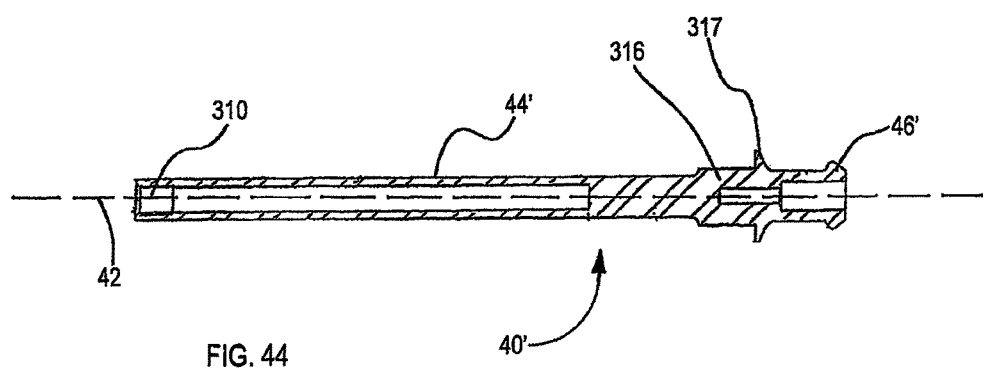
FIG. 44 is a cross-sectional side view of an alternate embodiment of the stunning rod of FIGS. 32-43.
Figure 47:
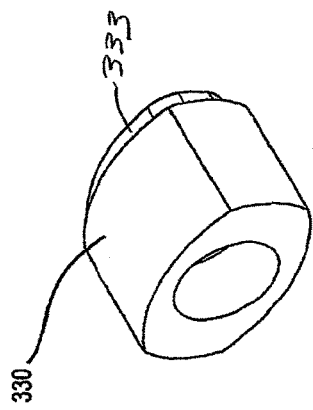
FIG. 47 is a perspective view of the hardened tip of FIG. 46.
Figure 46:
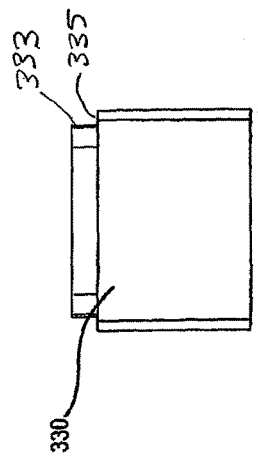
FIG. 46 is a top view of the hardened tip of the alternate embodiment stunning rod of FIG. 37.
Figure 48:
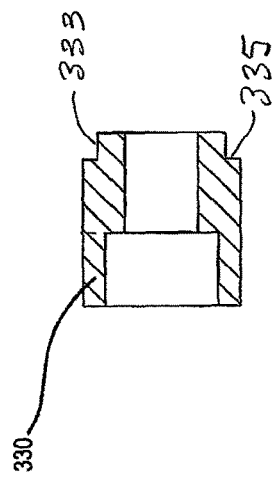
FIG. 48 is a longitudinal cross-sectional view of the hardened tip of FIG. 46.

The stunning rod embodiment shown 40' has an elongated body 44' extending along a longitudinal axis 42' (FIG. 39), with the elongated body 44' having a forward end 310 and an opposite rearward end 312. Body 44' may be solid for all or a portion of its length (FIG. 39), or may be hollow for all or a portion of its length (FIG. 44). The forward end 310 has a lip 311 extending out from the elongated body 44' parallel to the longitudinal axis 42'. The forward end 310 is sized with the same diameter(s) as the stunning rod body for striking (e.g. penetrating) an animal's head. Alternatively, the rod forward end 310 may be sized or may have an attachment (not shown) that has a sufficiently larger diameter to prevent penetration of the animal to be stunned. A hardened tip 330, as shown in FIGS. 46-48, may further be attached to the forward end 310 of the stunning rod 40' in the manner as shown in FIGS. 37 and 38 by employing a threaded or other fastener 329. A stepped down central projection 333 with a diameter less than that of the opposite tip end is fitted into a comparably sized opening 309 in the end of the elongated body 44, so that the tip shoulder 335' of tip 333' contacts the stunning rod body end 310. The opposite rearward end 312 has formed in (or received as a separate piece as shown in FIGS. 37, 38, and 40) an outwardly extending lip 46' for engagement with a catch 20, as described elsewhere herein. If the catch lip 46' is a separate piece, it may be secured by a fastener 329 into the end 312 (FIG. 37) or complementarily threaded with end 312 and screwed on.

Figure 45:
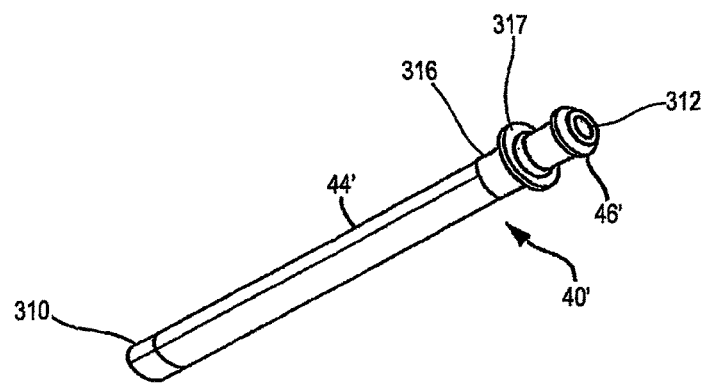
FIG. 45 is a perspective view of the alternate embodiment stunning rod of FIG. 44.

As shown in FIGS. 44 and 45, the stunning rod 40' also has a mounting portion 316 adjacent to the elongated body 44' and located between the forward end 310 and rearward end 312. The mounting portion 316 may have a circular profile for receiving a piston 48'. The mounting portion 316 has a radially outwardly extending flange 317 which is perpendicular to the elongated body 44', as shown in FIG. 44. Referring to FIG. 41, the piston 48' has a cylindrical body with the front and rear surfaces both being flat. The piston 48' has a circular inner bore 52' for slideably receiving the stunning rod 40'. In particular, the size of the inner bore 52' conforms to the radial measurements of the mounting portion 316, which is also circular in shape. The piston 48' is axially received and rests on mounting portion 316 in a tight sliding fit against flange 317.

Alternatively, piston 48' may be integrally formed with rod 40' of one piece, as shown in FIG. 39. The elongated body 44' has a circular profile adjacent to the piston 48' portion of the stunning rod 40'. On the forward end 310 facing side of the piston 48', the elongated body 44' flanges out in a semicircular manner where the forward-facing surface of the piston 48' and elongated body 44' integrally meet. The rearward end 312 adjacent piston 48' may receive or have integrally formed therein of one piece a lip 46' (FIG. 40) for engaging the catch.

Figure 32:
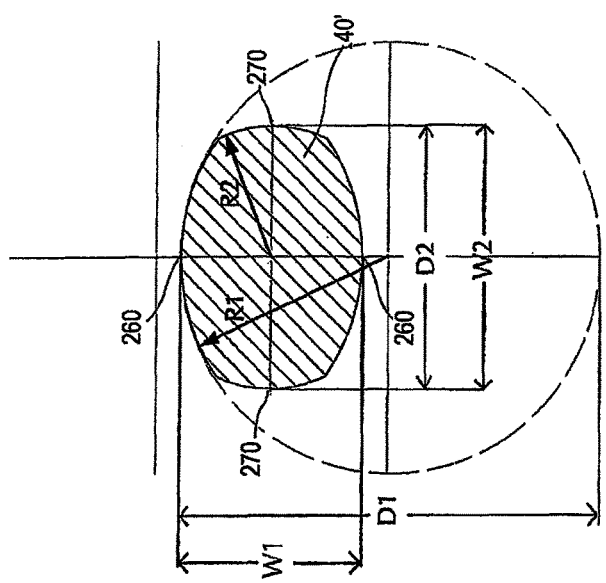
FIG. 32 is a cross-sectional view through the body of the stunning rod, according to an alternate embodiment of the present invention, showing the different radii of and widths between the opposing sides.
Figure 33:
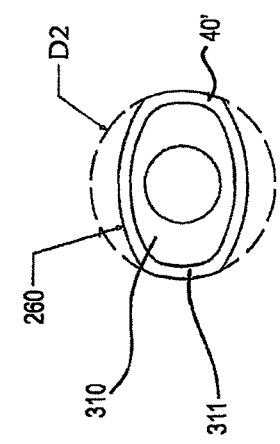
FIG. 33 is a frontal view of the stunning rod of FIG. 32.
Figure 35:
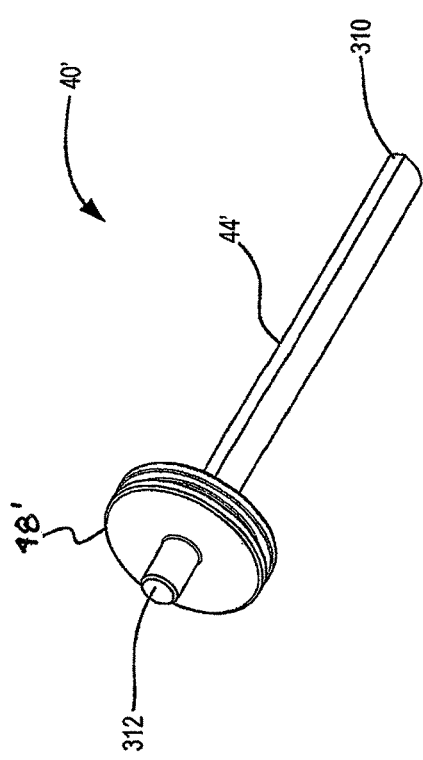
FIG. 35 is a rear perspective view of the stunning rod and piston of FIG. 34.
Figure 36:
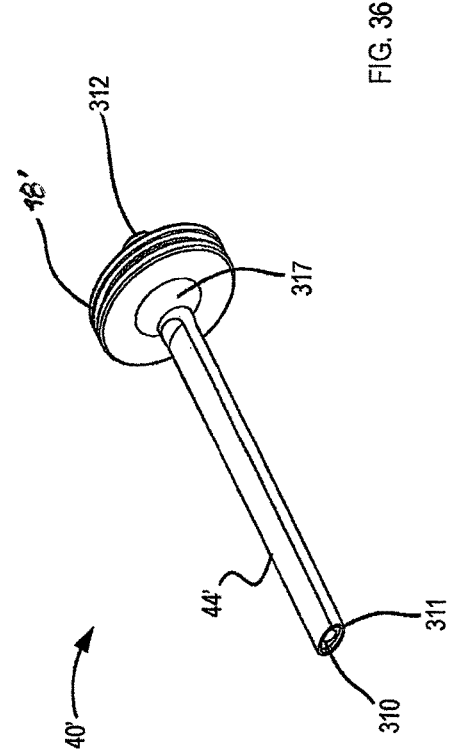
FIG. 36 is a front perspective view of the stunning rod and piston of FIG. 35.

Referring to FIGS. 32 and 33, all or a portion of the length of body 44' of stunning rod 40' between the piston 48' and forward end 310 is configured to have a first pair of opposite sides 260 each having a first radius R1 and a first diameter D1, and width W1 between them in the Y-direction, and a second pair of opposite sides 270 each having a second radius R2 and a second diameter D2, and width W2 between them in the X-direction. The first radius R1 of the first pair of opposite sides 260 may be different from and larger than the second radius R2 of the second pair of opposite sides 270. The first width W1 between the first pair of sides 260 may be different from and smaller than the second width W2 of the second pair of sides 270. The rod 40' slides in the stunner in a comparably shaped opening in the nose and nose guide of the stunner, discussed further below. The first radius R1 may be any suitable dimension, such as from about 0.500-0.700 inches (1.27-1.778 cm), e.g., 0.600 in. (1.52 cm) and the second radius R2 may be any suitable dimension, such as from about 0.25-0.45 inches (0.635-1.143 cm), e.g. 0.375 in. (0.95 cm). The first width W1 may thus be any suitable dimension, such as from about 0.425-0.625 inches (1.0795-1.5875 cm), and the second width W2 may be any suitable dimension, such as from about 0.65-0.85 inches (1.651-2.159 cm), e.g., 0.750 in. (1.91 cm). Other sizes and dimensions may be employed. Stunning rod tip 330 as shown in FIGS. 46-48 may be likewise configured to have the same first radius and first diameter, second radius and second diameter, and widths in the Y- and X-directions, respectively, as stunning rod body 44'.

FIGS. 49-57 depict yet another embodiment of the stunning rod 40" which may be used in place of stunning rod 40 and 40' described previously, and comparable portions of the rod are numbered similarly, but with double prime (") markings. This embodiment of the stunning rod 40" is composed of an elongated solid aluminum body 44" having a forward end 310" and rearward end 312". Stunning rod piston 48" may be integrally formed and of one piece with rod body 44" (as shown in FIG. 39), or rod body 44" may be configured to receive piston 48" as a separate piece (as shown in FIGS. 44 and 45). The opposite rearward end 312" may have formed in, or received as a separate piece, an outwardly extending lip for engagement with a catch, as shown in FIGS. 37, 38, and 40 and as described elsewhere herein with previous stunning rod embodiments 40 and 40'. The elongated body 44" may have a constant radius extending substantially the entire length of rod 40" (FIGS. 49-51), or may have first and second differing radii as shown in previous embodiments (FIGS. 42-48). The elongated body 44" may be made of any suitably strong metal, alloy or composite material that is both lighter in weight than steel and having a lower density. More than one material may be used to construct the elongated body of the rod.

This light weight and density results in an increase in striking speed when the stunning rod 40" is released from the catch, as compared to a stunning rod conventionally made entirely of steel. The use of such aluminum or other lighter weight and density body 44" additionally creates less recoil for end-users of the stunner 10, and also results in a smoother impact with the animal. The lightweight elongated body may also decrease manufacturing costs, because it enables lower cost solid bodies to be employed, and eliminates any need to employ higher cost hollow bodies. Instead of or in addition to aluminum (having a density of approximately 2.7 g/cm$^3$), other materials may be used to form the stunning rod body, such as, but not limited to, carbon fiber (density of approx. 2.0 g/cm$^3$), silicon (density of approx. 2.33 g/cm$^3$), silicon nitride (density of approx. 3.17 g/cm$^3$), titanium density of (approx. 4.54 g/cm$^3$), and the like, with densities lower than 7.5 g/cm$^3$, less than that of steel (density of approx. 7.85 g/cm$^3$).

Figure 49:
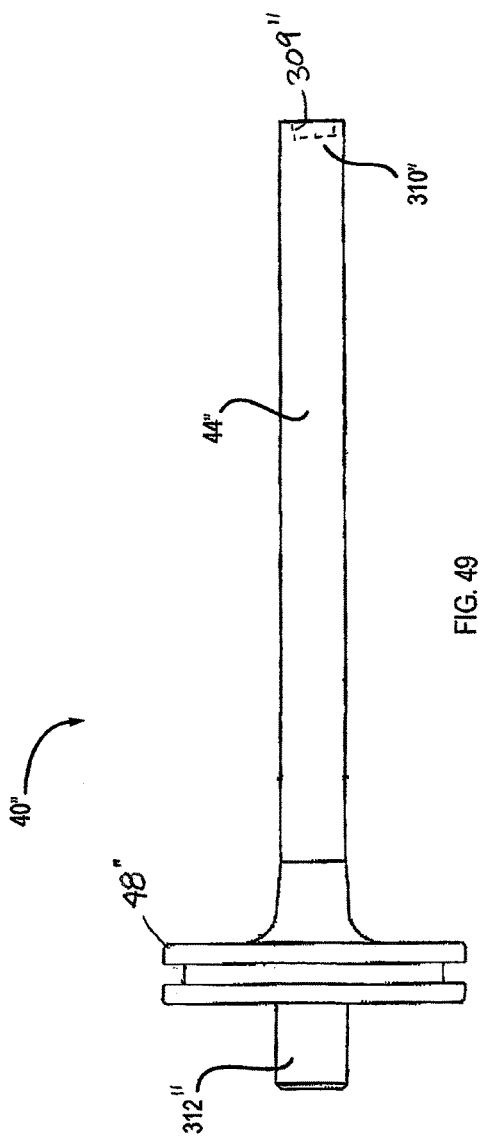
FIG. 49 is a side view of yet another embodiment of the stunning rod of the present invention.
Figure 51:
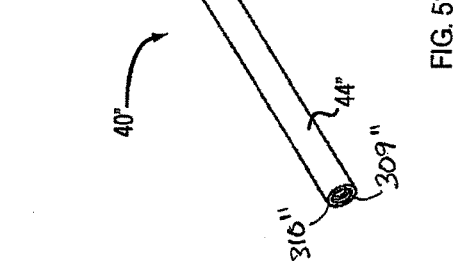
FIG. 51 is a perspective view of the lightweight stunning rod embodiment of FIG. 49.
Figure 50:
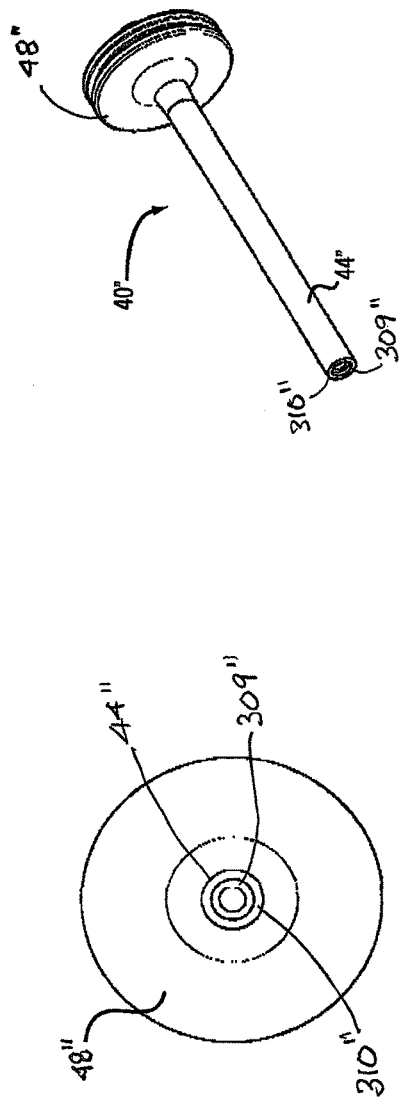
FIG. 50 is a front view of the lightweight stunning rod embodiment of FIG. 49.
Figure 53:
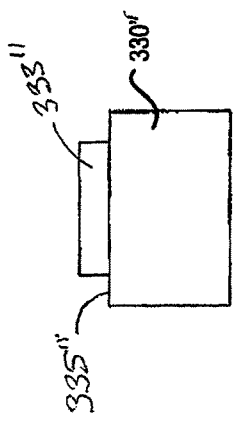
FIG. 53 is a top-down view of the strike end of FIG. 52.
Figure 52:
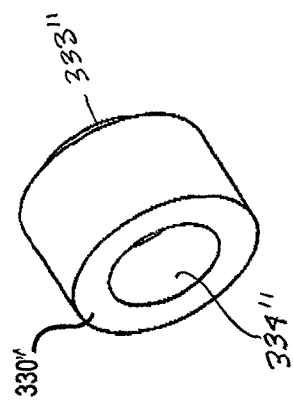
FIG. 52 is a perspective view of the strike end attachable to the nose of the lightweight stunning rod embodiment of FIG. 49.
Figure 56:
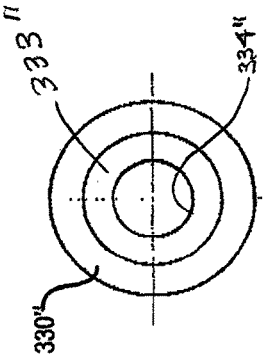
FIG. 56 is a rear view of the strike end of FIG. 52.
Figure 55:
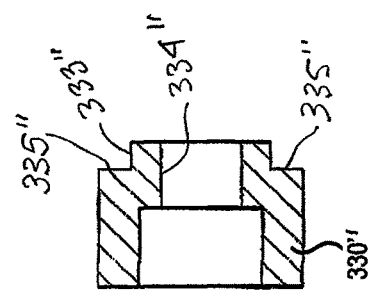
FIG. 55 is a side cross-sectional view of the strike end of FIG. 52.
Figure 54:
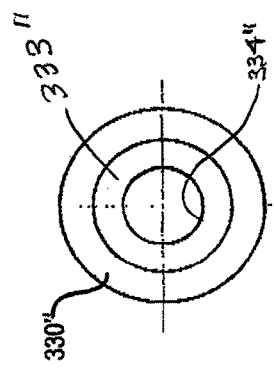
FIG. 54 is a front view of the strike end of FIG. 52.

An alternate embodiment of the detachable hardened tip or striking end 330 previously described is shown as tip 330" secured to the forward end 310" of the aluminum stunning rod 40" (FIGS. 52-57). The embodiment of tip 330" as shown in FIGS. 52-56 has a circular cross section with stepped down central projection 333" with a diameter less than that of the opposite tip end that may be fitted into a comparably sized opening 309" in the end of the elongated body 44" (FIGS. 49-51). When installed, the shoulder 335" of tip 333" contacts the end 310" of stunning rod body 44". A fastener (such as fastener 329 shown in FIGS. 37 and 38) may be fitted through central opening 334" to secure tip 330" to the forward end 310" of body 44". If elongated body 44" has a non-circular cross section with first and second differing radii as shown in previous embodiments (FIGS. 42-45), then tip 330" will likewise have a non-circular cross section with comparable first and second differing radii (FIGS. 46-48).

Figure 57:
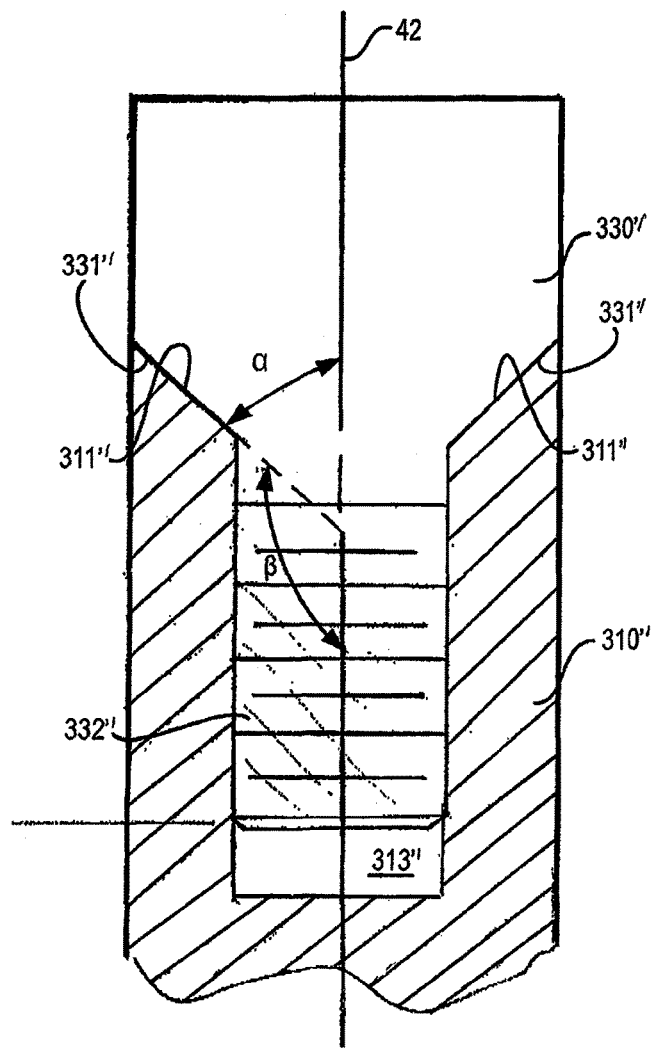
FIG. 57 is a top cross-sectional view of the nose and strike end configuration of the lightweight stunning rod of FIGS. 49-56.

Another tip embodiment is further shown in FIG. 57, wherein a central shaft 332" extending longitudinally from detachable hardened tip 330" has a diameter less than that of the tip end and is threaded to be fastened within a comparably threaded bore 313" in the center of the forward end 310" of the aluminum stunning rod body 44". Conversely, a threaded shaft may instead protrude from the forward end 310" to be threadingly received by a threaded bore in the detachable hardened tip 330" (not shown). Lower, outer edges 331" of tip 330" facing (and adjacent upon connection to) the stunning rod forward end 310" are beveled inwardly from the outer tip diameter to the threaded shaft at an acute angle α of about 45° with respect to the longitudinal axis 42, as shown in the embodiment. Outer edges 311" of forward end 310' of the rod body 44" are beveled at an angle β of about 135° with respect to the longitudinal axis 42. Angle α may be any other angle less than 90°, for example an angle in the range of 30° to 60°, to which angle β may be supplementary, with such combination being meant to further increase the contact and holding strength of hardened tip 330" within the rod body 44". Thus upon attachment, the combined angles α, β of the hardened tip edges 331" and forward end edges 311" form a substantially 180° angle. This combination of the beveled ends 331", 311" and threaded connectors 332", 313" greatly decreases the likelihood of detachment of the hardened tip 330" during operational use of the stunner 10. The detachable hardened tip 330" may be made of steel, so that elongated body portion of the stunning rod has a density less than that of the tip. If the elongated body 44" is made of more than one material, the elongated body in this embodiment has an average density less than the density of the detachable hardened tip.

Figure 42:
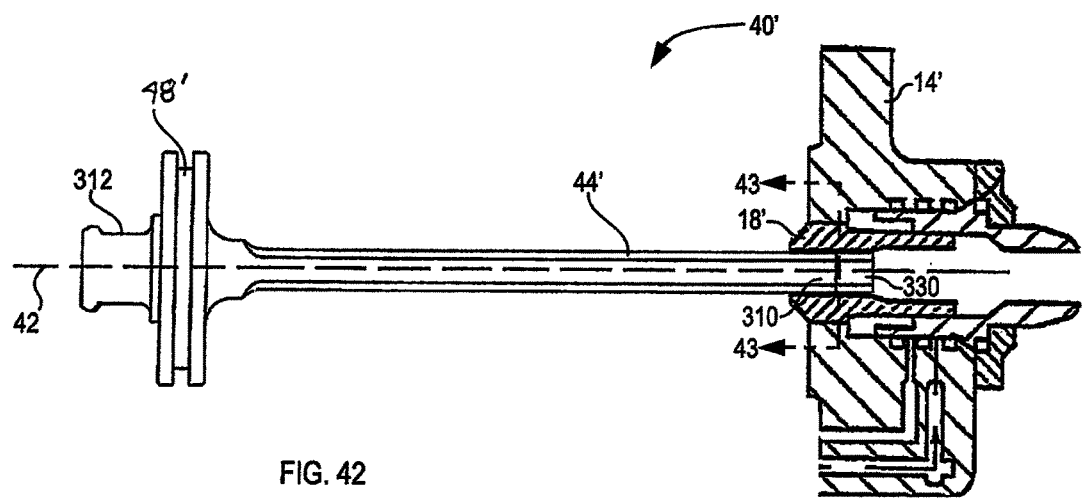
FIG. 42 is a side view of the stunning rod and piston of FIG. 37 with the forward end within the outer housing nose of the stunner of the present invention.
Figure 43:
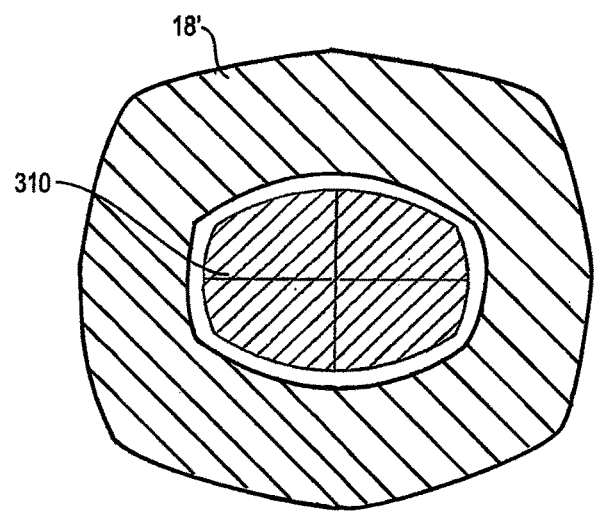
FIG. 43 is a cross-sectional view of the front face of the stunning rod of FIG. 42 within the outer housing nose, along lines 43-43.

Referring to FIGS. 42-43, an outer housing nose 14' surrounds the stunning rod 40' and includes a nose guide 18' with an opening through which the stunning rod passes. The bore in the outer housing nose guide 18' is slightly larger than and conforms to the radii R1, R2 and widths W1, W2 (as shown in FIGS. 32 and 33) of the stunning rod 40' so as to permit sliding movement in the longitudinal direction. Unlike the circular cross section of the body 44 of stunning rod 40 described previously, the non-circular cross section configuration of the rod body 44' with different widths in the X- and Y-directions prevents rotational movement of the rod about the longitudinal axis 42' within the nose guide and housing upon firing of the stunner.

Figure 11:
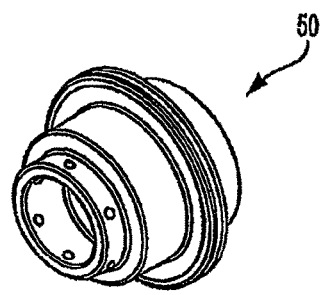
FIG. 11 is a perspective view of the catch piston according to the present invention.
Figure 12:
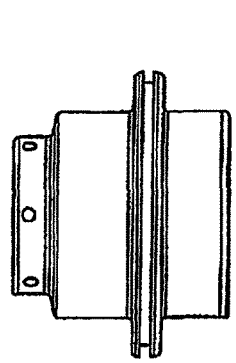
FIG. 12 is a side elevational view of the catch piston shown in FIG. 11.
Figure 13:
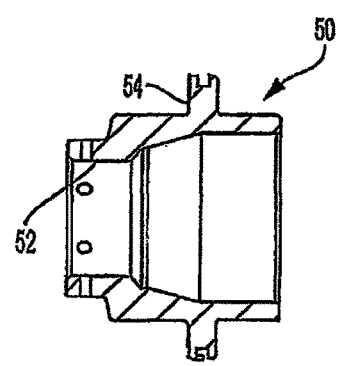
FIG. 13 is a side cross sectional view of the catch piston shown in FIG. 11.
Figure 14:
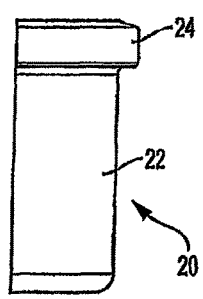
FIG. 14 is a side elevational view of a catch according to the present invention.
Figure 15:
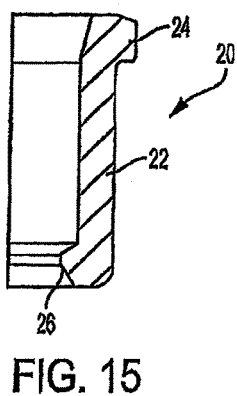
FIG. 15 is a cross sectional view of the catch shown in FIG. 14.
Figure 16:
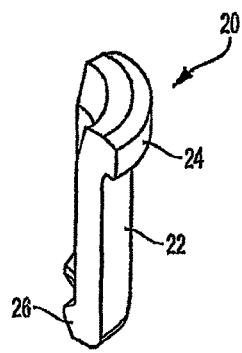
FIG. 16 is a perspective view of the catch shown in FIG. 14.

The structure and operation of catch 20 with respect to the stunning rod is shown in more detail in FIGS. 7-24. FIGS. 7-10 show the stunning rod 40 comprising an elongated body 44 having a longitudinal axis 42. A stunning rod lip 46 is disposed on one end of the stunning rod 40. FIGS. 11-13 show a catch piston 50 having a smooth inner bore 52 and a catch piston flange 54. The stunning rod 40 is axially disposed on piston 48 within the housing 12 and is capable of being driven forward along the longitudinal axis 42 towards the front end of the housing 12 when pressurized air or other pneumatic fluid enters the chamber, as described above. The stunning rod 40 shown with the forward end sized for striking (e.g. penetrating) the animal's head, but other stunning rod designs and styles may be employed, including those with sufficiently large diameter of the forward end to prevent penetration of the animal being stunned. The alternate embodiment of stunning rod 44' may be employed in place of the embodiment 40 shown in FIGS. 7-24.

Figure 7:
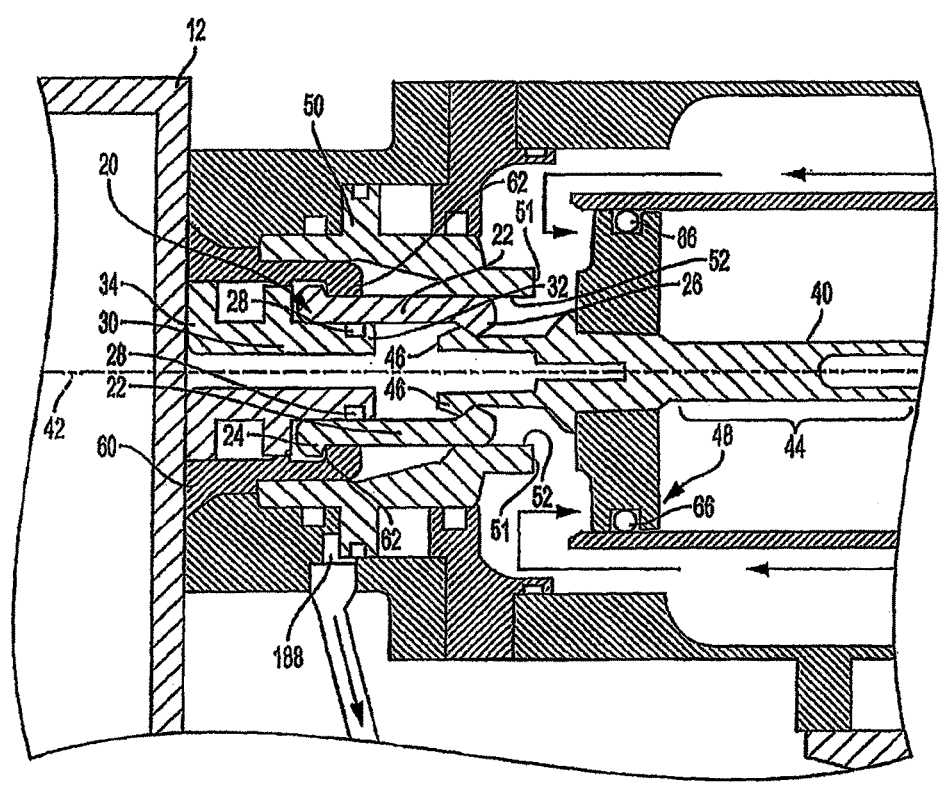
FIG. 7 is an enlarged cross-sectional view of the animal stunner catch system shown in the hold position of FIG. 3.
Figure 8:
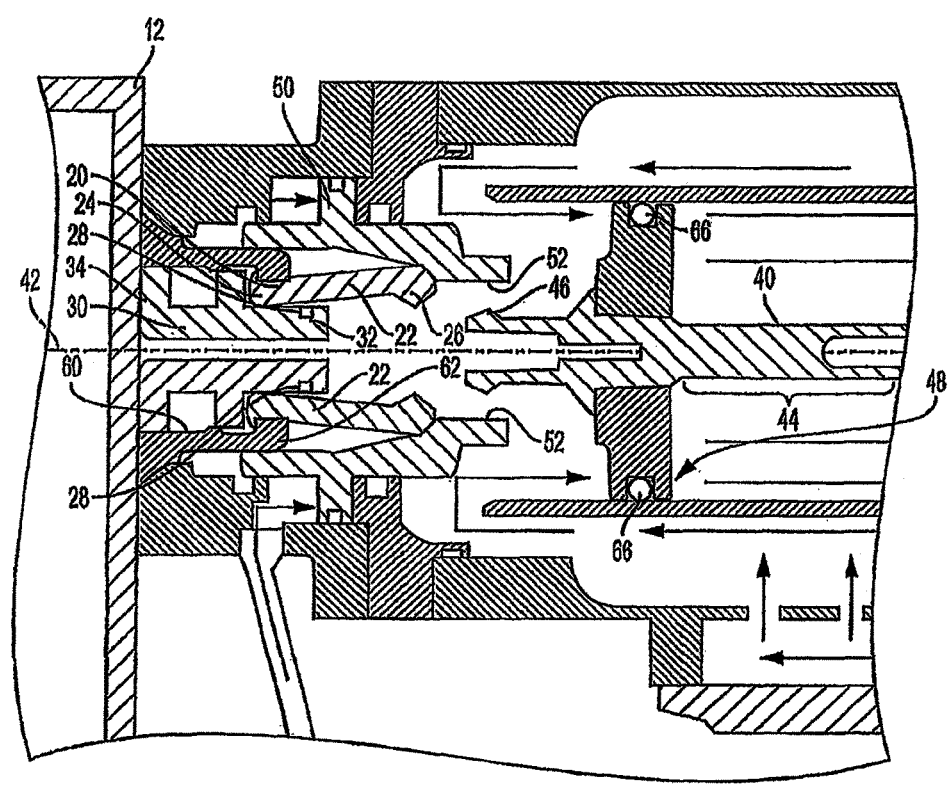
FIG. 8 is an enlarged cross-sectional view of the animal stunner catch system shown in the released position of FIG. 4.
Figure 9:
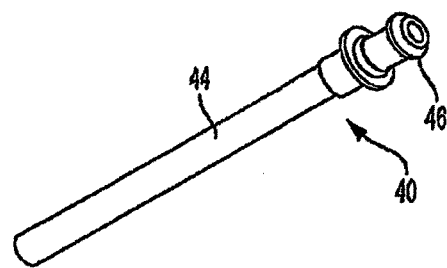
FIG. 9 is a perspective view of one example of the stunning rod according to the present invention.
Figure 10:
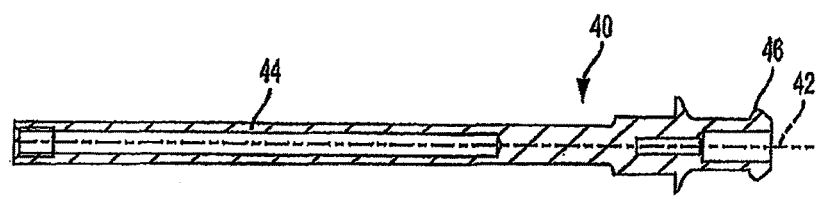
FIG. 10 is a cross sectional view of one example of the stunning rod of FIG. 9.

FIGS. 14-17 show catch 20 having a catch body 22, at the forward end a catch end portion 26 with inward extending lips and near the rearward end an outward extending catch flange 24. Catch 20 is mounted within the housing 12 outside of the stunning rod longitudinal axis 42 for alternately holding and releasing the stunning rod 40. The catches 20 shown in FIGS. 3-8 are two of four arcuate catches that may be arrayed around axis 42 as shown in their hold position (FIG. 17) and employed in the example depicted in the drawings. Fewer or more than four catches may be employed. Catch body 22 rotates with respect to a catch pivot or post, shown herein in the form of a catch pivot ring 60 extending around the outer sides of the catch bodies (FIGS. 7 and 8). The catch flange 24 extends outwardly away from axis 42 and is engageable with a catch pivot ring inner lip 62 extending inwardly from the end of the cylindrical body 64 of catch pivot ring 60 shown in FIGS. 18-20.

As shown in FIGS. 7 and 8, catch body portion 22 is pivotally mounted on inner lip 62, between stationary catch pivot ring 60, disposed on a side away from axis 42, and stationary catch support 30 (see also FIGS. 21-24), disposed on a side toward axis 42. The catch support 30 has a cylindrical body portion 36 and includes a circular support head 34 disposed adjacent the back portion of the housing 12 and a circular catch support distal end 32 which is disposed within the four arcuate catches 20. An external groove 33 is disposed in and around the outside of body 36 adjacent end 32 to receive an optional O-ring (discussed further below). The catch body portion 22 is disposed on an outward side of catch support 30 away from the stunning rod longitudinal axis 42. The catch 20 includes the end portion 26 extending from the body portion 22 toward the housing front end 14 and distal from the catch support 30. Since the example employs a plurality of catches (four) arrayed about longitudinal axis 42, each catch 20 is constructed and held between catch pivot ring 60 and catch support 30 so that their ends 26 are normally extended away from each other and axis 42. The catch end portion 26 is movable by catch piston 50 to a hold position toward the longitudinal axis 42, where it engages stunning rod lip 46 preventing the stunning rod 40 from being driven forward. In the hold position catch body 22 is in contact with both the stationary catch pivot ring 60 and the stationary catch support distal end 32.

When catch piston 50 is longitudinally moved forward (FIG. 8), as will be described further below, the constraint placed on catch end portion 26 is removed, and the end portion 26 moves outward to a release position away from stunning rod lip 46 and the stunning rod longitudinal axis 42 permitting the stunning rod 40 to be driven forward. Outward movement of catch end portion 26 is caused by sliding movement of the angle or taper between the forward portion of stunning rod lip 46 and the rearward portion of the inward facing lip of catch end portion 26, as stunning rod 40 moves longitudinally forward. Catch end portion 26 may optionally be assisted in being urged to spring outward by an optional catch tension O-ring or elastic member 28 wrapped around the body 36 of the catch support 30, in groove 33. When in the hold position (FIG. 7), O-ring or elastic member 28 is compressed by catch body 22, so that when catch piston 50 moves forward, member 28 expands, thereby urging the catch body 22 and end 26 away from axis 42, which assists in reducing wear on the outer forward tapered surface of stunning rod lip 46. In this catch end portion release position away from axis 42, catch body 22 is in contact with the stationary catch pivot ring 60 and out of contact with the stationary catch support distal end 32. The catch flange 24 is engaged with the catch pivot ring inner lip 62, allowing the catch flange 24 to be held pivotally between the catch pivot ring inner lip 62 and the catch support cylindrical body portion 36 (FIGS. 21, 23, 24), allowing the catch 20 to pivot about the catch flange as shown in FIG. 8.

Figure 17:
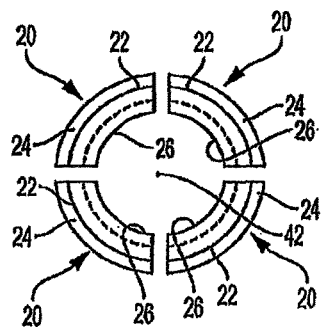
FIG. 17 is an end elevational view of four of the catches shown in FIG. 14 arrayed in the hold position around the longitudinal axis of the stunning rod.
Figure 18:
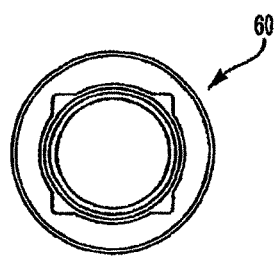
FIG. 18 is a top elevational view of the catch pivot ring according to the present invention.
Figure 19:
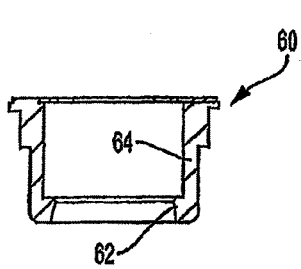
FIG. 19 is a side cross sectional view of the catch pivot ring shown in FIG. 18.
Figure 20:
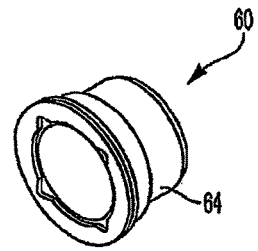
FIG. 20 is a perspective view of the catch pivot ring shown in FIG. 18.
Figure 21:
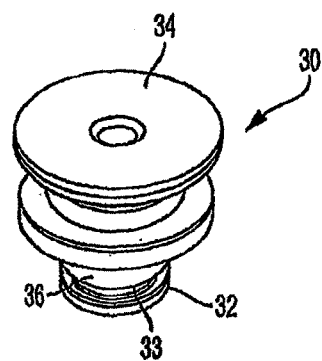
FIG. 21 is a perspective view of the catch support according to the present invention.
Figure 22:
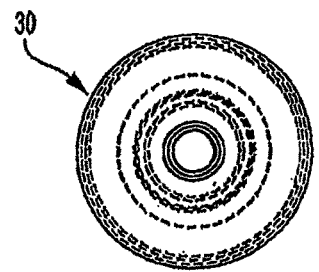
FIG. 22 is a top elevational view of the catch support shown in FIG. 21.
Figure 23:
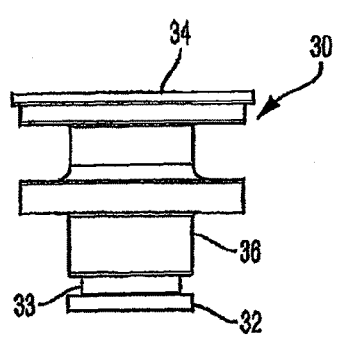
FIG. 23 is a side elevational view of the catch support shown in FIG. 21.
Figure 24:
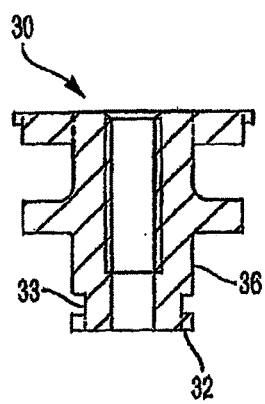
FIG. 24 is a side cross sectional view of the catch support shown in FIG. 21.

The catch 20 may be an arcuate section of a cylinder having an inner catch end portion 26 and an outer flange 24. The catch 20 shown in FIG. 16 has an arc of less than 90° as shown in FIG. 17 so that four catches 20 may be arranged cylindrically about the longitudinal axis 42 and within the catch pivot ring 60 with sufficient space between the catches 20 for the catches 20 to pivot on the catch pivot ring inner lip 62 without interfering with one another. The four catches 20 are supported from collapsing on one another by the catch support 30.

The catch piston 50 is disposed adjacent the catch end portion 26 on a catch side away from the longitudinal axis. The catch piston 50 is in sliding contact with the catch 20 adjacent the catch end portion 26 and out of contact with the catch body portion 22. The catch piston 50 is adapted to slide in the directions of the longitudinal axis 42 between a first, rearward position, shown in FIG. 3, urging the catch end portion 26 toward the stunning rod lip 46 longitudinal axis 42 in the hold position, thereby holding and preventing the stunning rod 40 from being driven forward, and a second, forward position, shown in FIG. 4, permitting the catch end portion 26 to move to the release position away from the stunning rod lip 46 longitudinal axis 42, releasing and permitting the stunning rod 40 to be driven forward.

As described above in connection with FIG. 6, at the end of the firing sequence piston 48 reverses direction in chamber 180, and moves rearward to strike the forward end 51 of catch piston 50, to move it rearward and force catches 20 inward, as shown in FIG. 7. In the closed or locked position, the catch end portion 26 is fully engaged with the stunning rod lip 46, holding the stunning rod 20 from moving forward. The catch 20 is held in the fully engaged position by the catch piston inner bore 52. In operation, as the firing sequence commences, the pneumatic pressure in chamber 188 moves the catch piston 50 forward (rightward) toward the housing front end 14. Once the inner bore 52 moves forward past the catch end portion 26, as shown in FIG. 8, the catch 20 pivots about the catch pivot ring inner lip 62 wherein each catch end portion 26 moves outward from the cylindrical orientation, disengaging the catch end portion 26 and the stunning rod lip 46. In the disengaged position, the catch body portion 22 is not in contact with the catch piston 50 or the stationary catch support distal end 32. The force of pressurized air drives piston 48 forward and stunning rod 40 (or 40'/40") moves along the stunning rod longitudinal axis 42 toward the housing front end 14 from the force of the pressurized air or other pneumatic fluid.

The present invention therefore provides an improved animal stunner in which the stunning rod exhibits an increase in striking speed when the stunning rod is released from the catch, creates less recoil for users of the stunner, and also results in a smoother impact with the animal. The stunning rod elongated body enables lower cost solid bodies to be employed, with a gain in animal stunning effectiveness.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:
1. A stunning rod adapted for use in a pneumatic animal stunner for stunning an animal, the rod being mountable with a piston and movable within an inner chamber in the stunner, the inner chamber having a catch for alternately holding and releasing the stunning rod, the rod comprising:
   an elongated body having a density and a non-circular cross section, a forward end sized to receive a detachable tip, an opposite rearward end adapted to receive an outwardly extending lip for engagement with the catch; and a detachable tip for striking an animal's head, the detachable tip being received in and secured to the forward end of the elongated body, the detachable tip having a density greater than the density of the elongated body and a non-circular cross section, wherein the stunning rod is capable of being driven forward along a longitudinal axis within the stunner inner chamber to stun an animal, and rearward along the longitudinal axis to retract and hold the stunning rod by the catch.

2. The stunning rod of claim 1 wherein the elongated body is made of aluminum.

3. The stunning rod of claim 2 wherein the detachable tip is made of hardened steel.

4. The stunning rod of claim 1 wherein the elongated body between the rearward end and forward end has a density less than that of steel.

5. The stunning rod of claim 1 wherein the elongated body has a density less than the density of the detachable tip.

6. The stunning rod of claim 1 wherein the elongated body density is less than 7.5 g/cm$^3$ and the detachable tip density is greater than 7.5 g/cm$^3$.

7. The stunning rod of claim 1 wherein the elongated body includes a piston movable within an inner chamber in the stunner, the piston being adjacent the elongated body rearward end and integral and of one piece with the body.

8. The stunning rod of claim 1 wherein the elongated body rearward end is threaded to receive a complementarily threaded outwardly extending lip for engagement with the catch.

9. A stunning rod adapted for use in a pneumatic animal stunner for stunning an animal, the inner chamber having a catch for alternately holding and releasing the stunning rod, the rod comprising:

an elongated body made of aluminum and having a non-circular cross section, the elongated body having a forward end sized to receive a detachable tip, an opposite rearward end adapted to receive an outwardly extending lip for engagement with the catch, and a piston adjacent the elongated body rearward end and integral and of one piece with the body, the piston being movable within an inner chamber in the stunner; and a detachable tip made of steel for striking an animal's head and having a non-circular cross section, the detachable tip being received in and secured to the forward of the end elongated body, wherein the stunning rod is capable of being driven forward along a longitudinal axis within the stunner inner chamber to stun an animal, and rearward along the longitudinal axis to retract and hold the stunning rod by the catch.

10. The stunning rod of claim 9 wherein the elongated body rearward end is threaded to receive a complementarily threaded outwardly extending lip for engagement with the catch.

11. The stunning rod of claim 9 wherein the detachable tip is secured to the forward end of the elongated body via a fastener.

12. A pneumatic animal stunner, the stunner having an inner chamber, and including the rod of claim 1 mountable with a piston and movable within the inner chamber, the inner chamber having a catch for alternately holding and releasing the stunning rod for stunning an animal.

13. The stunning rod of claim 1 wherein the elongated body has along at least a portion of the length a first pair of opposite sides having a first radius and a first width, and a second pair of opposite sides having a second radius and a second width, the radius of the second pair of opposite sides being different from the radius of the first pair of opposite sides, and the first width between the first pair of opposite sides being smaller than the second width between the second pair of opposite sides.

14. The stunning rod of claim 13 wherein the detachable tip has a first pair of opposite sides having a first radius and a first width, and a second pair of opposite sides having a second radius and a second width, the first and second radii of the tip being the same as the first and second radii of the elongated body, and the first and second widths of the tip being the same as the first and second widths of the elongated body.

15. The stunning rod of claim 14 wherein the radius of the first pair of opposite sides of the elongated body and the tip is from about 0.50-0.70 inches (1.27-1.78 cm), and the radius of the second pair of opposite sides of the elongated body and the tip is from about 0.25-0.45 inches (0.64-1.14 cm).

16. The stunning rod of claim 14 wherein the width between the first pair of opposite sides of the elongated body and the tip is from about 0.425-0.625 inches (1.0795-1.5875 cm), and the width between the second pair of opposite sides of the elongated body and the tip is from about 0.65-0.85 inches (1.65-2.16 cm).

17. The stunning rod of claim 1 wherein the detachable tip is secured to the elongated body via a fastener.

18. The stunning rod of claim 1 wherein the elongated body includes a piston moveable within an inner chamber in the stunner, the piston being adjacent the elongated body rearward end and slideably mounted on the elongated body.

19. A method of making a stunning rod adapted for use in a pneumatic animal stunner for stunning an animal, the rod being mountable with a piston and movable within an inner chamber in the stunner, the inner chamber having a catch for alternately holding and releasing the stunning rod, comprising:

providing an elongated body having a density and a non-circular cross section, a forward end sized to receive a detachable tip, an opposite rearward end adapted to receive an outwardly extending lip for engagement with the catch;

providing a detachable tip for striking an animal's head, the detachable tip having a density greater than the density of the elongated body and a non-circular cross section; and attaching the detachable hardened tip to the elongated body forward end to create a stunning rod;

wherein the stunning rod is capable of being driven forward along a longitudinal axis within the stunner inner chamber to stun an animal, and rearward along the longitudinal axis to retract and hold the stunning rod by the catch.

20. The method of claim 19 wherein the elongated body is made of aluminum and the detachable tip is made of hardened steel.

21. The method of claim 19 wherein the elongated body includes a piston movable within an inner chamber in the stunner, the piston being adjacent the elongated body rearward end and integral and of one piece with the body.

22. The method of claim 19 wherein the elongated body rearward end is threaded to receive a complementarily threaded outwardly extending lip for engagement with the catch, and including securing the outwardly extending lip to the elongated body rearward end.

23. The method of claim 19 wherein the elongated body has along at least a portion of the length a first pair of opposite sides having a first radius and a first width, and a second pair of opposite sides having a second radius and a second width, the radius of the second pair of opposite sides being different from the radius of the first pair of opposite sides, and the first width between the first pair of opposite sides being smaller than the second width between the second pair of opposite sides.

24. The stunning rod of claim 23 wherein the detachable tip has a first pair of opposite sides having a first radius and a first width, and a second pair of opposite sides having a second radius and a second width, the first and second radii of the tip being the same as the first and second radii of the elongated body, and the first and second widths of the tip being the same as the first and second widths of the elongated body.

25. The stunning rod of claim 24 wherein the radius of the first pair of opposite sides of the elongated body and the tip is from about 0.50-0.70 inches (1.27-1.78 cm), and the radius of the second pair of opposite sides of the elongated body and the tip is from about 0.25-0.45 inches (0.64-1.14 cm).

26. The stunning rod of claim 24 wherein the width between the first pair of opposite sides of the elongated body and the tip is from about 0.425-0.625 inches (1.0795-1.5875 cm), and the width between the second pair of opposite sides of the elongated body and the tip is from about 0.65-0.85 inches (1.65-2.16 cm).

27. The method of claim 19 wherein the detachable hardened tip is attached to the elongated body forward end via a fastener.

28. The method of claim 19 wherein the stunning rod slides within the inner chamber without rotational movement about the longitudinal axis.

29. The method of claim 19 wherein the elongated body includes a piston moveable within an inner chamber in the stunner, the piston being adjacent the elongated body rearward end and slideably mounted on the elongated body.

* * * * *

UNITED STATES PATENT AND TRADEMARK OFFICE
CERTIFICATE OF CORRECTION

PATENT NO. : 10,258,051 B2  
APPLICATION NO. : 16/051822  
DATED : April 16, 2019  
INVENTOR(S) : Arthur Jones et al.

Page 1 of 1

It is certified that error appears in the above-identified patent and that said Letters Patent is hereby corrected as shown below:

In the Claims

In Column 17, Line 9, Claim 24 delete "stunning rod" and substitute therefore -- method --.

In Column 17, Line 17, Claim 25 delete "stunning rod" and substitute therefore -- method --.

In Column 18, Line 4, Claim 26 delete "stunning rod" and substitute therefore -- method --.

Signed and Sealed this
Fourth Day of February, 2020

Andrei Iancu
*Director of the United States Patent and Trademark Office*